US012680593B2

(12) United States Patent (10) Patent No.: US 12,680,593 B2
Kobayashi (45) Date of Patent: Jul. 14, 2026

(54) VALVE AND SHOCK ABSORBER

(71) Applicant: KYB Corporation, Tokyo (JP)

(72) Inventor: Yoshifumi Kobayashi, Tokyo (JP)

(73) Assignee: KYB Corporation, Tokyo (JP)

( * ) Notice: Subject to any disclaimer, the term of this patent is extended or adjusted under 35 U.S.C. 154(b) by 421 days.

(21) Appl. No.: 18/269,217

(22) PCT Filed: Jan. 7, 2022

(86) PCT No.: PCT/JP2022/000370
§ 371 (c)(1),
(2) Date: Jun. 22, 2023

(87) PCT Pub. No.: WO2022/196044
PCT Pub. Date: Sep. 22, 2022

(65) Prior Publication Data
US 2024/0044390 A1 Feb. 8, 2024

(30) Foreign Application Priority Data

Mar. 19, 2021 (JP) ................................. 2021-045332

(51) Int. Cl.
*F16F 9/34* (2006.01)
*F16F 9/18* (2006.01)
(Continued)
(52) U.S. Cl.
CPC .............. *F16F 9/348* (2013.01); *F16F 9/185* (2013.01); *F16K 15/148* (2013.01);
(Continued)
(58) Field of Classification Search
CPC .......... F16F 9/348; F16F 9/3485; F16F 9/185; F16F 2232/08; F16F 2222/12;
(Continued)

(56) References Cited

U.S. PATENT DOCUMENTS 5,042,624 A * 8/1991 Furuya .................... F16F 9/348
188/322.22
5,316,113 A * 5/1994 Yamaoka .............. F16F 9/3484
188/320

(Continued)

FOREIGN PATENT DOCUMENTS

CN 111630295 A 9/2020
JP S48-021377 B1 6/1973
(Continued)

OTHER PUBLICATIONS

Apr. 1, 2026, Chinese Office Action issued for related CN Application No. 202280010929.5.

*Primary Examiner* — Robert A. Siconolfi
*Assistant Examiner* — James K Hsiao
(74) *Attorney, Agent, or Firm* — Paratus Law Group, PLLC

(57) ABSTRACT

A valve of the present invention includes: a valve seat member that has a port, an annular window which communicates with an outlet end of the port, an inner-circumferential valve seat provided on an inner-circumferential side of the annular window, and an outer-circumferential valve seat of the annular window; a first valve body that are stacked on a valve seat member, that can seat on or come off the outer-circumferential valve seat to open or close the annular window, and that has a hole; a second valve body that is contained in the annular window so as to be movable in an axial direction and that closes the hole when abutting on a valve seat member side surface of the first valve body; a second valve body biasing member that is contained in the annular window and that biases the second valve body toward the first valve body; a regulating portion that restricts a movement of the second valve body in a direction in which the second valve body moves away from the first valve body; and a communication passage that secures commu- (Continued)

nication between the hole and the port even when the second valve body abuts on the regulating portion.

11 Claims, 9 Drawing Sheets

(51) Int. Cl.
  *F16F 9/348* (2006.01)
  *F16K 15/14* (2006.01)
(52) U.S. Cl.
  CPC ....... *F16F 2222/12* (2013.01); *F16F 2232/08* (2013.01); *F16F 2234/02* (2013.01)
(58) Field of Classification Search
  CPC .... F16F 2234/02; F16F 9/3484; F16F 9/3282; F16F 9/3487; F16F 9/3488; F16K 15/148
  See application file for complete search history.

(56) References Cited

U.S. PATENT DOCUMENTS

| | | | | | |
|---|---|---|---|---|---|
| 5,413,195 | A * | 5/1995 | Murakami | ............ | F16F 9/3484 |
| | | | | | 188/322.15 |
| 5,507,371 | A * | 4/1996 | Takahashi | ............... | F16F 9/446 |
| | | | | | 188/282.5 |
| 5,529,154 | A * | 6/1996 | Tanaka | .................. | F16F 9/3484 |
| | | | | | 188/280 |
| 5,615,756 | A * | 4/1997 | Grundei | ............... | F16F 9/3214 |
| | | | | | 188/322.18 |
| 5,937,976 | A * | 8/1999 | Grundei | ............... | F16F 9/3481 |
| | | | | | 188/322.22 |
| 6,129,005 | A * | 10/2000 | Asadi | ...................... | F16F 9/061 |
| | | | | | 92/183 |
| 6,276,498 | B1 * | 8/2001 | Kirchner | .............. | F16F 9/3405 |
| | | | | | 188/322.22 |
| 6,340,081 | B1 * | 1/2002 | Keil | ........................ | F16F 9/348 |
| | | | | | 188/322.22 |
| 6,460,664 | B1 * | 10/2002 | Steed | ...................... | F16F 9/348 |
| | | | | | 188/282.1 |
| 6,581,734 | B2 * | 6/2003 | Heyn | .................... | F16F 9/3485 |
| | | | | | 188/322.15 |
| 6,655,512 | B2 * | 12/2003 | Moradmand | ........... | F16F 9/348 |
| | | | | | 188/282.5 |
| 6,668,986 | B2 * | 12/2003 | Moradmand | ........... | F16F 9/466 |
| | | | | | 188/266.2 |
| 8,794,407 | B2 * | 8/2014 | Vanbrabant | ............... | F16F 9/34 |
| | | | | | 188/315 |
| 9,297,436 | B2 * | 3/2016 | Morita | .................. | F16K 15/144 |
| 9,441,699 | B2 * | 9/2016 | Lawler | .................. | F16F 9/3484 |
| 9,500,251 | B2 * | 11/2016 | Rummel | .................. | F16F 9/18 |
| 9,631,695 | B2 * | 4/2017 | De Kock | .................. | F16F 9/44 |
| 9,845,839 | B2 * | 12/2017 | Rummel | .................. | F16F 9/18 |
| 11,655,875 | B2 * | 5/2023 | Kobayashi | ........... | F16K 15/148 |
| | | | | | 188/281 |
| 2005/0211087 | A1 * | 9/2005 | Dourson | ............... | F16F 9/3485 |
| | | | | | 91/422 |
| 2005/0279597 | A1 * | 12/2005 | Yamaguchi | ............. | F16F 9/348 |
| | | | | | 188/322.13 |
| 2009/0107782 | A1 * | 4/2009 | Ota | ........................ | F16F 9/3485 |
| | | | | | 188/282.5 |
| 2011/0114428 | A1 * | 5/2011 | Vanbrabant | ............... | F16F 9/34 |
| | | | | | 188/322.15 |
| 2015/0316118 | A1 * | 11/2015 | Smeljanskij | .......... | F16F 9/5126 |
| | | | | | 188/313 |
| 2015/0323037 | A1 * | 11/2015 | De Kock | ................ | F16F 9/341 |
| | | | | | 188/313 |
| 2016/0258504 | A1 * | 9/2016 | Mizuno | ................. | F16F 9/3484 |
| 2018/0216690 | A1 * | 8/2018 | Yamashita | .............. | F16F 9/348 |
| 2018/0340589 | A1 * | 11/2018 | Cheong | ................. | F16F 9/3485 |
| 2021/0025471 | A1 * | 1/2021 | Kobayashi | .............. | F16F 9/185 |

FOREIGN PATENT DOCUMENTS

| | | |
|---|---|---|
| JP | S62-149644 U | 9/1987 |
| JP | H07-027164 A | 1/1995 |
| JP | 2007-303545 A | 11/2007 |
| JP | 2015-086966 A | 5/2015 |
| JP | 2019-143729 A | 8/2019 |

* cited by examiner

VALVE AND SHOCK ABSORBER

CROSS REFERENCE TO PRIOR APPLICATION

This application is a National Stage Patent Application of PCT International Patent Application No. PCT/JP2022/000370 (filed on Jan. 7, 2022) under 35 U.S.C. § 371, which claims priority to Japanese Patent Application No. 2021-045332 (filed on Mar. 19, 2021), which are all hereby incorporated by reference in their entirety.

TECHNICAL FIELD

The present invention relates to a valve and a shock absorber.

BACKGROUND ART

Valves have been conventionally used for, for example, a piston and other parts in a shock absorber, which is utilized as a suspension in a vehicle. A valve of this type includes: a valve seat member having a port via which separated operation chambers communicate with each other inside a shock absorber; and a main disc that is stacked on the valve seat member and opens or closes the port.

In the above valve, the inner circumference of the main disc is fixedly supported, whereas the outer circumferential side thereof is permitted from being warped. When the upstream pressure of the port reaches a valve opening pressure, the main disc becomes warped and then comes off an annular valve seat provided around the port of the valve seat member, thereby opening the port.

The valve further includes an orifice hole formed across the main disc. If the speed (piston speed) falls within an extremely low-speed range when the shock absorber extends or shortens, hydraulic oil is permitted to flow through the orifice hole before the port of the main disc is opened. A shock absorber equipped with such a valve can provide a damping force suitable for ride quality of a vehicle, in accordance with a piston speed.

When the operation chambers continuously communicate with each other via the orifice hole, it is difficult to independently set damping force characteristics (characteristics of damping force related to piston speed) on the extension and compression sides of the shock absorber. This is because the hydraulic oil flows through the same orifice hole, regardless of whether the shock absorber expands or shortens.

In consideration of the above, as disclosed in FIG. 2 of JP2015-86966 A, for example, a valve has been developed in which an annular sub-disc with its outer diameter smaller than that of the main disc is disposed between the main disc and the valve seat member. This sub-disc is used to open or close the orifice hole.

In the above valve, the inner circumference of the sub-disc is fixedly supported together with a leaf valve, whereas the outer-circumferential side thereof is permitted to be warped. Since the outer diameter of the sub-disc is smaller than that of the leaf valve, the sub-disc does not seat on the annular valve seat, but it comes into contact with or comes off the valve seat member side surface of the leaf valve, thereby opening or closing the orifice hole.

CITATION LIST

Patent Literature

Patent Literature 1: JP2015-86966A

SUMMARY OF INVENTION

Technical Problem

In the above valve, the inner circumference of the sub-disc is fixed in order for the sub-disc to open or close the orifice hole in the main disc. If the sub-disc has high flexural rigidity, the gap between the sub-disc and the main disc becomes narrow when the sub-disc opens the orifice holes. In this case, a pressure loss occurs in the hydraulic oil when the hydraulic oil flows through the orifice hole. Likewise, a pressure loss also occurs in the hydraulic oil when the hydraulic oil flows between the sub-disc and the main disc. As a result, when the shock absorber extends or shortens within an extremely low-speed range, the damping force becomes strong. As described above, a conventional valve disadvantageously generates strong damping force due to its orifice hole and thus gives vibrations to a vehicle body equipped with a shock absorber. This may make passengers uncomfortable and consequently impair the ride quality in the vehicle.

One conceivable method of attenuating a damping force generated due to an orifice hole in a valve is to slim down a sub-disc in order to lower its flexural rigidity. However, this method may be difficult to employ because such a thin sub-disc may be largely warped when being subjected to pressure or when being subjected to pressure from a port side with the orifice hole closed. As a result, the durability of the sub-disc may deteriorate.

An object of the present invention is to provide a valve that can attenuate a damping force and a shock absorber with such a valve.

Solution to Problem

A valve of the present invention, which has been made to accomplish the above object, includes: a valve seat member that has a port, an annular window which communicates with an outlet end of the port, an inner-circumferential valve seat provided on an inner-circumferential side of the annular window, and an outer-circumferential valve seat provided on an outer-circumferential side of the annular window; a first valve body that has an annular plate shape, is stacked on the valve seat member with an inner circumference thereof fixed, can seat on or come off the outer-circumferential valve seat to open or close the annular window, and has a hole which faces the annular window and which forms a throttle or a passage leading to the throttle; a second valve body that has an annular plate shape, is contained in the annular window so as to be movable in an axial direction, and closes the hole when abutting on a valve seat member side surface of the first valve body; a second valve body biasing member that is contained in the annular window and biases the second valve body toward the first valve body; a regulating portion that, when the second valve body moves a predetermined distance or more away from the first valve body, restricts a movement of the second valve body in a direction in which the second valve body moves away from the first valve body; and a communication passage that secures communication between the hole and the port even when the second valve body abuts on the regulating portion.

With the valve configured above, the durability of the second valve body can be improved, and the second valve body can be apart from the first valve body with a sufficient gap therebetween during the opening of the hole. As a result, the second valve body does not give unnecessary resistance to the flow of hydraulic oil. It is therefore possible to suppress the second valve body from adding an unnecessary damping force to a damping force generated in the throttle.

The valve may further include a first valve body biasing member that biases the first valve body toward the valve seat member. As the valve seat member is seen from a direction orthogonal to the axial direction of the annular window, the inner-circumferential valve seat may be disposed higher than the outer-circumferential valve seat. With the valve configured above, the first valve body is warped toward the second valve body, and the second valve body is biased toward the first valve body by the second valve body biasing member. As a result, the second valve body is brought into close contact with a piston side surface of the first valve body, thereby tightly closing the hole. It is therefore possible to reliably make the throttle function as a unidirectional orifice.

In the valve, a biasing member may include: an annular plate that has elasticity and is disposed on an opposite valve seat member side of the first valve body; and a ring that has an annular plate shape, is disposed between the first valve body and the annular plate, and has an inner diameter which is larger than any of inner diameters of the first valve body and the annular plate and which is smaller than any of outer diameters of the first valve body and the annular plate. With the valve configured above, a structure of the biasing member can be made simple and a length thereof in an axial direction can be made short. Thus, even if this valve is applied to a shock absorber, a stroke length of this shock absorber is not impaired. It is therefore possible to avoid an excessive increase in an entire length of the shock absorber. In this case, the biasing member may be formed of an elastic body.

The valve may further include a throttle valve body that has an annular plate shape and is provided with the throttle which leads to the hole when the throttle valve body is stacked on the opposite valve seat member side of the first valve body. With the valve configured above, an assembly process can be easily performed. In addition, the damping force can be continuously exerted with the opening area of a throttle made constant.

When the valve is provided with a fixed orifice, damping force characteristics on both extending and shortening sides of the shock absorber can be set independently.

In the valve, an inner-circumferential side surface of the annular window of the valve seat member may be formed of a cylindrical surface having a center aligned with an axial center of the annular window. The second valve body may have an inner circumference that is slidably in contact with the cylindrical surface and be guided by the cylindrical surface to move in the axial direction relative to the valve seat member. With the valve configured above, the second valve body is simply attached to the valve seat member, whereby the second valve body can be positioned relative to the valve seat member in a radial direction. Then, the second valve body can be made to face the hole of the first valve body in the axial direction. As a result, the second valve body can close the hole when abutting on the first valve body, without aligning the second valve body.

In the valve, the second valve body may have an inner circumference provided with one or more notches. In addition, a part or whole of the communication passage may be formed by the notches. With the valve configured above, a flow path of a liquid can be sufficiently secured from an initial stage of opening the valve in which the second valve body moves away from the first valve body. It is therefore possible to effectively reduce a pressure loss that would be caused by the second valve body, thereby further effectively attenuating a damping force.

A shock absorber of the present invention includes: a cylinder; a piston that is movably inserted into the cylinder and divides an interior of the cylinder into an extension side chamber and a compression side chamber; a piston rod that is inserted into the cylinder and coupled to the piston; an outer tube that covers the cylinder and forms a reservoir chamber between the outer tube and the cylinder; a valve case that is provided at an end of the cylinder and divides the compression side chamber from the reservoir chamber; a piston side valve that is provided on an extension side chamber side of the piston and opens or closes a compression side port provided in the piston; and a case side valve that is provided on a compression side chamber side of the valve case and opens or closes a suction port provided in the valve case. Furthermore, the shock absorber includes one or both of a valve disposed on a compression side chamber side of the piston; and a valve disposed on a reservoir chamber side of the valve case.

The shock absorber configured above can suppress generation of abnormal noise and, if being applied to a suspension of a vehicle, can improve ride quality in the vehicle.

Another shock absorber includes: a cylinder; a piston that is movably inserted into the cylinder and divides an interior of the cylinder into an extension side chamber and a compression side chamber; a piston rod that is inserted into the cylinder and coupled to the piston; an outer tube that is disposed on an outer circumference of the cylinder and has a reservoir chamber formed therein; a valve case that is provided at an end of the cylinder and divides the compression side chamber from the reservoir chamber; a piston side valve that is provided on an extension side chamber side of the piston and opens or closes a compression side port provided in the piston; a case side valve that is provided on a compression side chamber side of the valve case and opens or closes a suction port provided in the valve case; a damping passage via which the extension side chamber communicates with the reservoir chamber; and a variable damping valve that is provided in the damping passage and that gives resistance to a flow of a liquid flowing from the extension side chamber to the reservoir chamber. The shock absorber further includes one or both of a valve disposed on a compression side chamber side of the piston and a valve disposed on a reservoir chamber side of the valve case.

The shock absorber configured above can reliably close the throttle even in an unloaded state, thereby successfully suppressing generation of abnormal noise with its damping force variable range widened. If being applied to a suspension of a vehicle, the shock absorber can improve ride quality in the vehicle.

Advantageous Effects of Invention

With the valve and the shock absorber of the present invention, a damping force can be attenuated.

DESCRIPTION OF EMBODIMENTS

Figure 1:
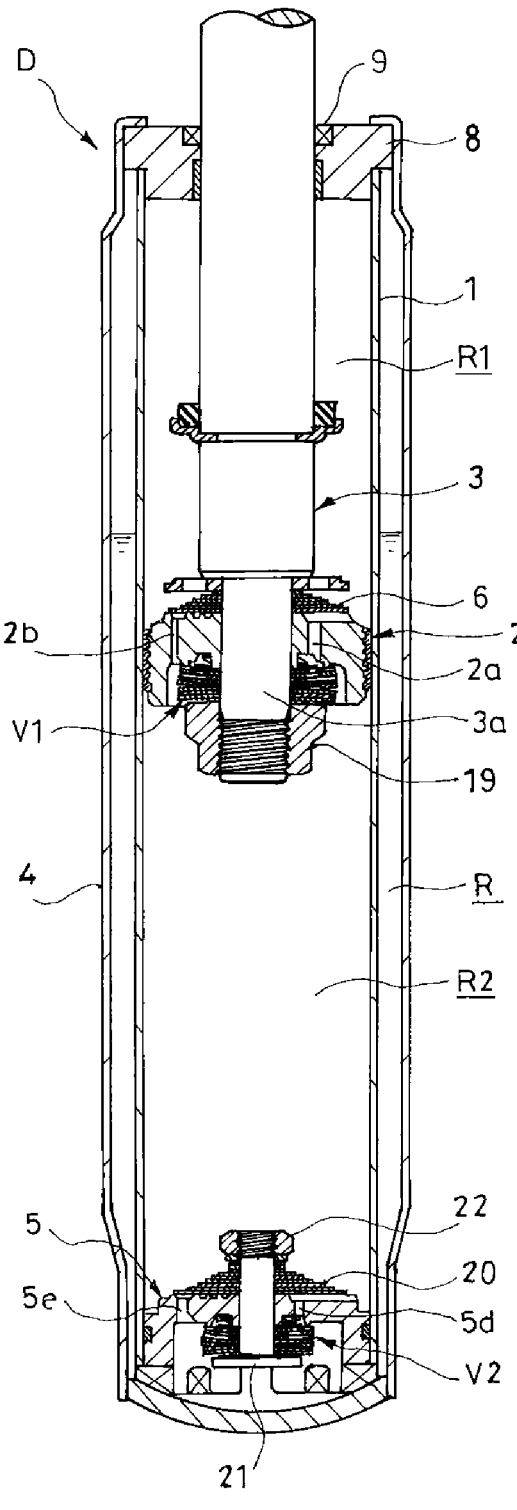
FIG. 1 is a cross-sectional view of a shock absorber according to an embodiment.

A valve and a shock absorber of the present invention will be described below, based on the accompanying drawings. As illustrated in FIG. 1, valves V1 and V2 according to one embodiment are used as an extension side damping valve of a piston section and a compression side damping valve of a base valve section in a shock absorber D.

Hereinafter, some components in the valves V1 and V2 and the shock absorber D will be described in detail. The shock absorber D includes: a cylinder 1; a piston 2 that is movably inserted into the cylinder 1 and divides an interior of the cylinder 1 into an extension side chamber R1 and a compression side chamber R2; a piston rod 3 that is inserted into the cylinder 1 and coupled to the piston 2; an outer tube 4 that covers the cylinder 1 and forms a reservoir chamber R between the outer tube 4 and the cylinder 1; a valve case 5 that is provided at an end of the cylinder 1 and divides the compression side chamber R2 from the reservoir chamber R; a piston side valve 6 that is provided on an extension side chamber side of the piston 2 and opens or closes compression side ports 2b provided in the piston 2; a case side valve 20 that is provided on a compression side chamber side of the valve case 5 and opens or closes suction ports 5e provided in the valve case 5; and the valve V1 in the piston section and the valve V2 in a base valve section, each of which serves as a valve.

The cylinder 1 having a tubular shape, into which the piston 2 is movably inserted as described above, defines the extension side chamber R1 on an upper side (in FIG. 1) of the piston 2 and the compression side chamber R2 on a lower side (in FIG. 1) of the piston 2. Each of the extension side chamber R1 and the compression side chamber R2 is filled with a liquid, more specifically, hydraulic oil, for example. Instead of the hydraulic oil, each of the extension side chamber R1 and the compression side chamber R2 may also be filled with water or an aqueous solution, for example, as the liquid.

The cylinder 1 is contained in the outer tube 4, which has a cylindrical shape with a bottom and is disposed on the outer side. The cylinder 1 forms the reservoir chamber R, which corresponds to an annular gap between the cylinder 1 and the outer tube 4. In this case, the reservoir chamber R is filled with hydraulic oil and gas. If a liquid is used as the hydraulic oil, the gas may be an inert gas, such as nitrogen, in order to prevent deterioration of the hydraulic oil.

The valve case 5 is fitted into and provided at a lower end (in FIG. 1) of the cylinder 1, dividing the compression side chamber R2 from the reservoir chamber R. In addition, a rod guide 8 that slidably supports the piston rod 3 is fitted into an upper end (in FIG. 1) of the cylinder 1. The rod guide 8 is fitted into an inner circumference of the outer tube 4 to cramp an upper end of the outer tube 4. As a result, the rod guide 8 is stacked on an upper side (in FIG. 1) of the rod guide 8 and fixed to the outer tube 4 together with a seal member 9, which seals gaps between the outer tube 4, the cylinder 1, and the piston rod 3. By fixing the rod guide 8 to the outer tube 4 in this manner, the cylinder 1 is pinched between the valve case 5 mounted on a bottom of the outer tube 4 and the rod guide 8. In addition, the cylinder 1 is also fixed inside the outer tube 4 together with the valve case 5. Instead of clamping an opening edge at the upper end of the outer tube 4, a cap may be screwed to the opening edge at the upper end. Then, this cap and a bottom portion of the outer tube 4 pinch the seal member 9, the rod guide 8, the cylinder 1, and the valve case 5 therebetween, thereby fixing these members to the interior of the outer tube 4.

Figure 2:
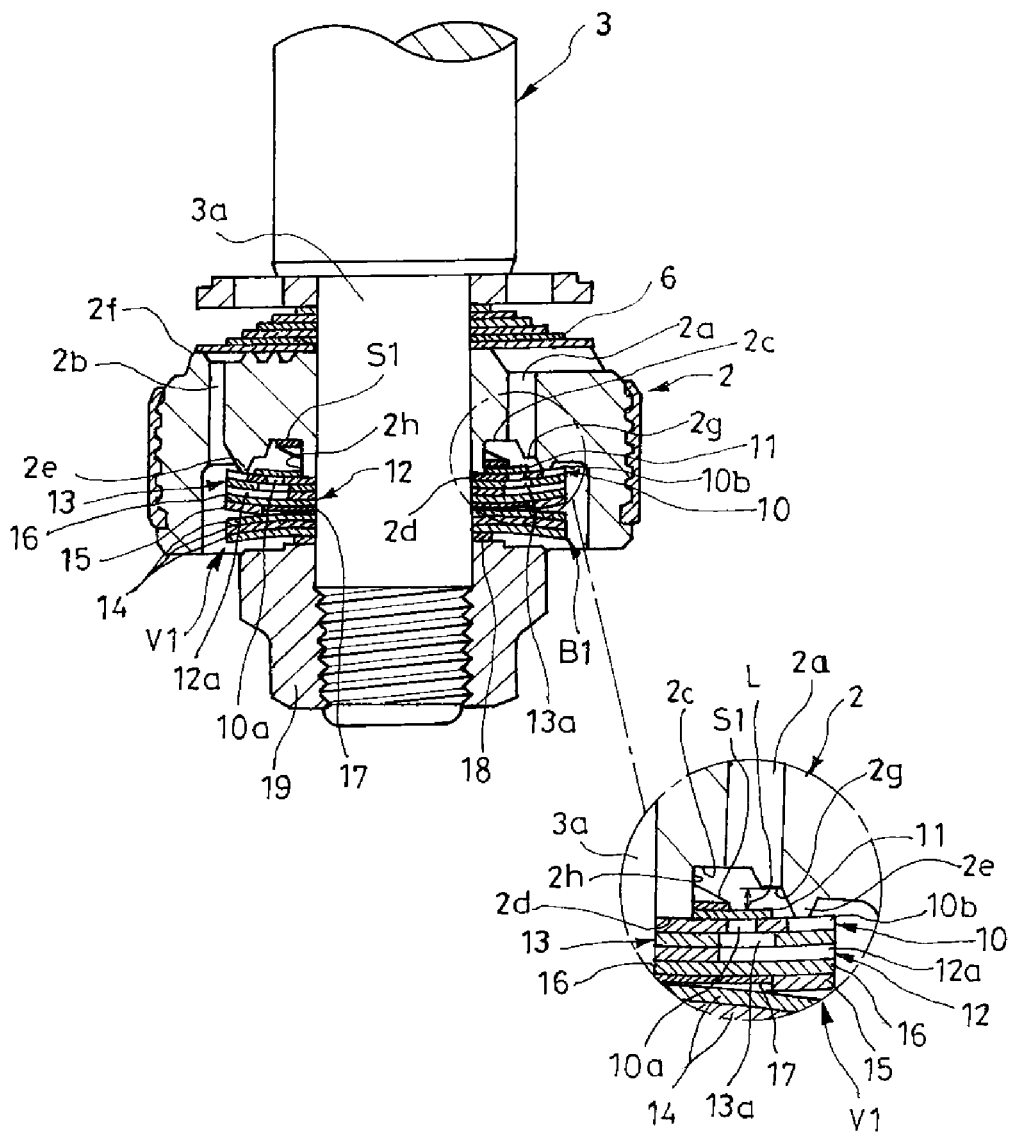
FIG. 2 is an enlarged cross-sectional view of a piston that employs a valve according to the embodiment.

As illustrated in FIGS. 1 and 2, the piston 2 having an annular shape is used as a valve seat member in the valve V1 and is fixed to a lower end (in FIG. 1) of the piston rod 3, which is one of both ends of the piston rod 3. The piston 2, which is used as the valve seat member, includes: extension side ports 2a, which correspond to ports via which the extension side chamber R1 communicates with the compression side chamber R2; and compression side ports 2b via which the compression side chamber R2 communicates with the extension side chamber R1. The plurality of extension side ports 2a provided in the piston 2 are arranged on the same circumference of the piston 2, the center of which is aligned with the center of the piston 2. The piston 2 includes an annular window 2c, which is an annular recess communicating with outlet ends of the extension side ports 2a on a compression side chamber side, which corresponds to the lower side (in FIG. 2). The piston 2 further includes: an annular inner-circumferential valve seat 2d on the inner-circumferential side of the annular window 2c at the lower end; and an annular outer-circumferential valve seat 2e on an outer-circumferential side of the annular window 2c. It should be noted that any numbers of extension side ports 2a and compression side ports 2b may be provided; a single extension side port 2a and a single compression side port 2b may be provided.

As the piston 2 is seen from a lateral direction (direction orthogonal to an axial direction of the piston 2) as illustrated in FIG. 2, when both heights of the inner-circumferential valve seat 2d and the outer-circumferential valve seat 2e provided at the lower end of the piston 2 are compared, the inner-circumferential valve seat 2d is disposed higher than the outer-circumferential valve seat 2e. As illustrated in FIG. 2, the lower side of the inner-circumferential valve seat 2d is positioned on the compression side chamber R2 side, which is lower than the lower side of the outer-circumferential valve seat 2e in FIG. 2. Thus, a height difference is secured between the inner-circumferential valve seat 2d and the outer-circumferential valve seat 2e.

A plurality of the compression side ports 2b are provided on the same circumference of the piston 2 and closer to the outer-circumferential side than the extension side ports 2a are. The lower end opening of each compression side port 2b, which corresponds to an inlet end, is open closer to the outer-circumferential side than the outer-circumferential valve seat 2e is. The piston 2 is provided with petal-type valve seats 2f that independently surround the upper end openings of the respective compression side ports 2b, which correspond to outlet ends thereof. The outlet ends of the compression side ports 2b independently open at the upper side of the piston 2 without communicating with one another. The inlet end of each extension side port 2a communicates with the extension side chamber R1 via a gap between portions of a petal-type valve seat 2*f* which surround a corresponding compression side port 2*b* and its adjacent compression side port 2*b*.

As illustrated in FIG. 2, the bottom portion of the annular window 2*c* in the piston 2 has a stepped shape in which its outer-circumferential side is one step higher than its inner-circumferential side. An annular regulating portion 2*g* is formed in a portion on the bottom of the annular window 2*c* which is one step higher on its outer-circumferential side. As illustrated in FIG. 2, the inner-circumferential side surface of the annular window 2*c* in the piston 2 is formed as a cylindrical surface 2*h*, the center of which is aligned with an axial center of the annular window 2*c*.

The piston side valve 6 is formed by stacking a plurality of annular plates on an extension side chamber side of the piston 2, which corresponds to an upper side (in FIG. 2) thereof. The piston side valve 6 has an inner circumference as a fixed side and an outer-circumferential side permitted to be warped. When the pressure inside the compression side chamber R2 exceeds that inside the extension side chamber R1, the piston side valve 6 is subjected to the pressure from the compression side chamber R2 via the compression side port 2*b*, thereby becoming warped. In response, the piston side valve 6 comes off the petal-type valve seat 2*f* and then opens, opening each compression side port 2*b*. As a result, the compression side chamber R2 communicates with the extension side chamber R1. When the pressure inside the extension side chamber R1 exceeds that inside the compression side chamber R2, the piston side valve 6 is pressed by the extension side chamber R1 acting from the back side and then brought into contact with each petal-type valve seat 2*f*. In response, each compression side port 2*b* closes to shut off the communication between the compression side chamber R2 and the extension side chamber R1. In short, the piston side valve 6 functions as a check valve that opens or closes each compression side port 2*b* by seating on or coming off the petal-type valve seats 2*f*.

The piston 2 is provided with the valve V1 on its compression side chamber side, which corresponds to a lower side (in FIG. 2) thereof. The valve V1 includes: a first valve body 10 that has an annular plate shape, is stacked on the piston 2 with its inner circumference fixed, can seat on or come off the outer-circumferential valve seat 2*e* to open or close the annular window 2*c*, and has holes 10*a* facing the annular window 2*c*; a second valve body 11 that has an annular plate shape, is contained in the annular window 2*c* so as to be movable in axial directions, and closes the holes 10*a* when abutting on a valve seat member side surface of the first valve body 10; an orifice valve body 12 that is stacked on an opposite valve seat member side of the first valve body 10 and acts as a throttle valve body having orifices 12*a* as throttles leading to the holes 10*a*; a first valve body biasing member B1 that biases the first valve body 10 toward the piston 2; a second valve body biasing member S1 that is contained in the annular window 2*c* and biases the second valve body 11 toward the first valve body 10; the regulating portion 2*g* that restricts a movement of the second valve body 11 in a direction away from the first valve body 10 when the second valve body 11 moves a predetermined distance away from the first valve body 10; and a communication passage that secures the communication between the holes 10*a* and each extension side port 2*a* serving as a port even when the second valve body 11 abuts on the regulating portion 2*g*.

Figure 3:
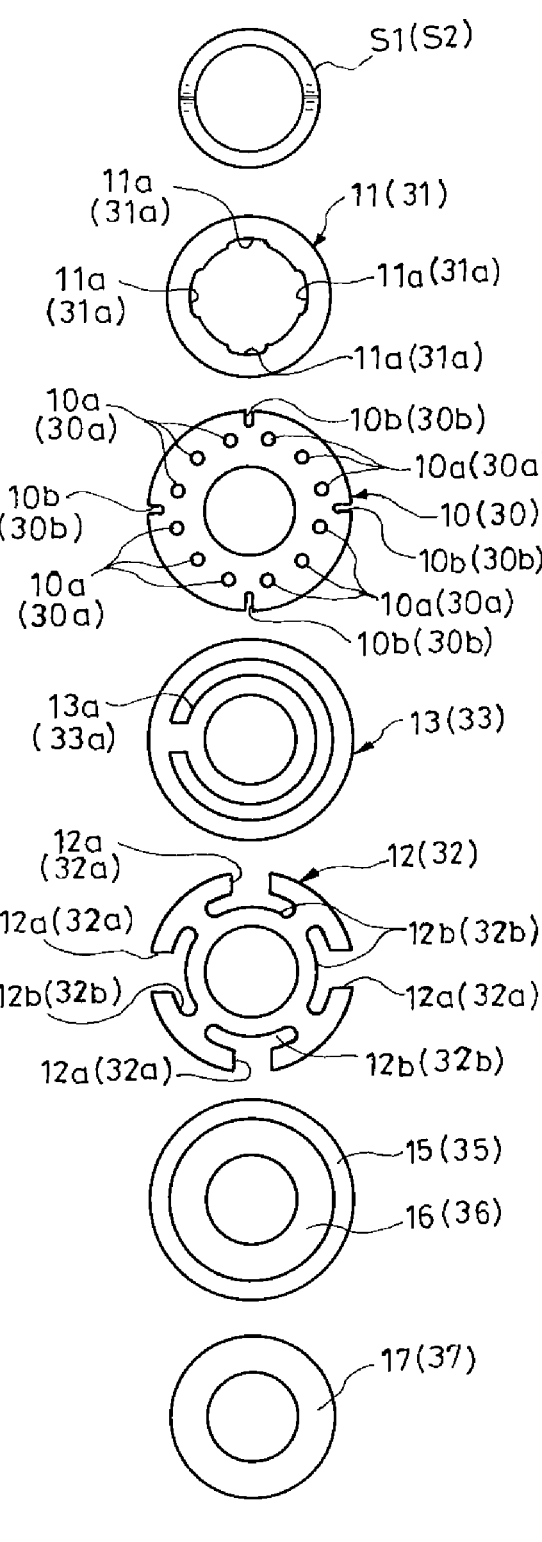
FIG. 3 is plan views of components, other than a valve seat member, in the valve according to the embodiment.

In the first valve body 10, which has an annular plate shape as described above, the inner circumference is immovably fixed to the piston 2 as a valve seat member, whereas only the outer-circumferential side is permitted to be warped. The outer-circumferential side opens or closes the extension side ports 2*a* by seating on or coming off the outer-circumferential valve seat 2*e*. The first valve body 10 functions as a main valve body of the valve V1. In the present embodiment, as illustrated in FIG. 3, the first valve body 10 is provided with the plurality of holes 10*a* arranged in a circumferential direction at positions facing the annular window 2*c* and further provided with the plurality of fixed orifices 10*b* formed as notches on the outer circumference. Thus, when the first valve body 10 seats on the outer-circumferential valve seat 2*e*, each extension side port 2*a* communicates with the compression side chamber R2 via the fixed orifices 10*b*.

The second valve body 11 is disposed on the piston side of the first valve body 10. The second valve body 11 is contained in the annular window 2*c* and is movable in the axial directions inside the annular window 2*c*. As illustrated in FIG. 3, the second valve body 11 has an annular plate shape, the outer diameter of which is smaller than the inner diameter of the outer-circumferential valve seat 2*e* and is a diameter large enough to open or close the holes 10*a*. In addition, the second valve body 11 has an inner circumference that is slidably in contact with the cylindrical surface 2*h* on the inner-circumferential side of the annular window 2*c* of the piston 2. In short, the second valve body 11 is positioned inside the annular window 2*c* in the radial directions relative to the piston 2 by the cylindrical surface 2*h* of the annular window 2*c*. In addition, the second valve body 11 faces the holes 10*a* of the first valve body 10 in the axial directions and can be guided by the cylindrical surface 2*h* to move in the axial directions without axial displacements. Since the inner-circumferential surface of the annular window 2*c* is formed as the cylindrical surface 2*h*, the second valve body 11 is movable in the axial directions inside the annular window 2*c* without being disturbed by the inner-circumferential surface of the annular window 2*c*.

An annular wave washer is disposed, as the second valve body biasing member S1, between the second valve body 11 and the bottom of the annular window 2*c*. The second valve body biasing member S1 biases the second valve body 11 toward the first valve body 10 and, in a no-load state where no pressure is applied, brings the second valve body 11 into contact with the first valve body 10. When abutting on the first valve body 10, the second valve body 11 closes the holes 10*a*. The second valve body biasing member S1 may be any elastic body that can bias the second valve body 11 toward the first valve body 10 so that the second valve body 11 abuts on the first valve body 10 and may be an elastic body, such as a coil spring, a disc spring, or a rubber. If the second valve body biasing member S1 is coupled to the second valve body 11 in a state where the second valve body biasing member S1 and the second valve body 11 cannot move relatively to each other in the radial directions, the second valve body biasing member S1 may be fitted to the outer circumference of the cylindrical surface 2*h*, instead of bringing the inner circumference of the second valve body 11 into slidable contact with the cylindrical surface 2*h*. Even in this case, since the second valve body 11 is positioned relative to the piston 2 in the radial directions, the second valve body 11 can close the holes 10*a* when the second valve body 11 abuts on the first valve body 10 while facing the holes 10*a* in the first valve body 10.

The outer diameter of the second valve body 11 is set to be larger than the inner diameter of the regulating portion 2*g* on the bottom of the annular window 2*c*. Thus, when the second valve body 11 moves toward the first valve body 10 in the annular window 2c to come into contact with the piston side surface of the first valve body 10, the second valve body 11 closes the holes 10a. When the second valve body 11 comes off the first valve body 10 and moves toward the piston 2 by a predetermined distance L or more inside the annular window 2c, the outer circumference of the second valve body 11 abuts on the regulating portion 2g, so that the further movement of the second valve body 11 toward the piston 2 is restricted.

As illustrated in FIG. 3, the second valve body 11 is provided with a plurality of notches 11a on its inner cir-cumference. Thus, when coming off the first valve body 10, the second valve body 11 makes a space on a piston 2 side of the second valve body 11, which corresponds to the upper side (in FIG. 2) thereof, communicate with a space on a first valve body 10 side of the second valve body 11, which is the lower side (in FIG. 2) thereof, via the outer circumference as well as the notches 11a on the inner-circumferential side.

When the second valve body 11 moves the predetermined distance L or more away from the first valve body 10, the outer circumference of the second valve body 11 abuts on the annular regulating portion 2g. When the second valve body 11 abuts on the regulating portion 2g in this manner, a flow path area between the outer circumference of the second valve body 11 and the outer-circumferential side surface of the annular window 2c decreases. However, the outlet ends of the extension side ports 2a still communicates with the space on the first valve body 10 side of the second valve body 11 via the notches 11a on the inner circumfer-ence of the second valve body 11. Thus, even when the second valve body 11 abuts on the regulating portion 2g, the flow path area in the flow path from the extension side port 2a to the hole 10a does not decrease. In the valve V1 according to the present embodiment, as described above, each notch 11a on the inner circumference of the second valve body 11 functions as a communication passage via which the extension side ports 2a communicates with the holes 10a even when the second valve body 11 abuts on the regulating portion 2g. If being formed in the second valve body 11, a communication passage may be a hole formed across the second valve body 11, instead of the notches 11a provided on the inner circumference of the second valve body 11.

Continuing to the above, the orifice valve body 12 is provided on an opposite piston side of the first valve body 10 according to the present embodiment. The orifice valve body 12 has an annular plate shape, the outer diameter of which is as large as that of the first valve body 10 and the inner circumference of which serves as a fixed side. The outer circumference of the orifice valve body 12 is permitted to be warped together with the first valve body 10. As illustrated in FIG. 3, the orifice valve body 12 includes: four arc-shaped holes 12b arranged on the same circumference; and four orifices 12a that open on the outer circumference and leads to the corresponding arc-shaped holes 12b.

In the present embodiment, as illustrated in FIG. 2, an annular disc 13, the outer diameter of which is as large as that of the first valve body 10, is disposed between the first valve body 10 and the orifice valve body 12. As illustrated in FIG. 3, the disc 13 has an inner circumference as a fixed side and an outer circumference permitted to be warped together with both the first valve body 10 and the orifice valve body 12. The disc 13 includes a C-shaped notch 13a that faces the holes 10a in the first valve body 10 and the arc-shaped holes 12b in the orifice valve body 12. In this case, the holes 10a communicate with the orifices 12a via the notch 13a and the arc-shaped holes 12b and function as passages leading to the orifices 12a. When the second valve body 11 opens the holes 10a, the extension side chamber R1 communicates with the compression side chamber R2 via the holes 10a, the notch 13a, the arc-shaped holes 12b, and the orifices 12a. As described above, the disc 13 serves to orient the notch 13a toward the holes 10a and the arc-shaped holes 12b and make them communicate with one another. In this case, the disc 13 is provided to increase the degree of communication between the holes 10a and the arc-shaped holes 12b independently of the circumferential relative position of the first valve body 10 and the orifice valve body 12. If the degree of communication between the holes 10a in the first valve body 10 and the arc-shaped holes 12b in the orifice valve body 12 can be somewhat secured, the disc 13 may be optional.

As illustrated in FIG. 2, the first valve body biasing member B1 is disposed on the opposite piston side of the first valve body 10 and is stacked on the opposite piston side of the orifice valve body 12. More specifically, the first valve body biasing member B1 includes: annular plates 14, each of which has elasticity and is disposed on the opposite piston side of the first valve body 10; and a ring 15 that has an annular plate shape and is disposed between the first valve body 10 and the annular plate 14.

The plurality of annular plates 14 are provided by being stacked and has an inner circumference immovably fixed to the piston 2 and an outer-circumferential side permitted from being warped. The ring 15 has an inner diameter that is larger than any of the inner diameters of the first valve body 10 and the annular plate 14 and that is smaller than any of the outer diameters of the first valve body 10 and the annular plate 14. In the present embodiment, as illustrated in FIG. 3, the ring 15 is attached to an annular plate-shaped ring holding ring 16 stacked on the opposite piston side of the orifice valve body 12. The ring holding ring 16, the diameter of which is as large as that of the first valve body 10, has an inner circumference immovably fixed to the piston 2 and has an outer-circumferential side permitted from being warped. In addition, the ring holding ring 16 has an outer circumference to which the ring 15 is attached with welding or adhesion. Furthermore, a spacer 17, which is formed of an annular plate with its outer diameter smaller than the inner diameter of the ring 15 and its thickness smaller than that of the ring 15, is disposed on the opposite piston side of the ring holding ring 16. The spacer 17 also has an inner circumference as a fixed side and an outer-circumferential side permitted from being warped.

An annular spacer 18, the outer diameter of which is smaller than that of the annular plate 14, is stacked on the opposite piston side of the annular plate 14 in the first valve body biasing member B1. The piston side valve 6, the piston 2, the first valve body 10, the disc 13, the orifice valve body 12, the ring holding ring 16 equipped with the ring 15, the spacer 17, the three annular plates 14, and the spacer 18 are mounted in this order on the outer circumference of a small-diameter portion 3a provided at the lower end of the piston rod 3. They are then fixed to the piston rod 3 by a piston nut 19 screwed to an end of the small-diameter portion 3a. When fixed by screwing the piston nut 19 to the small-diameter portion 3a, the piston side valve 6, the first valve body 10, the disc 13, the orifice valve body 12, the ring holding ring 16, the spacer 17, and the annular plate 14 are fixed to the piston rod 3, with their inner circumferences being fixed and their outer circumferences being permitted from being warped. In this case, both of the second valve body 11 and the second valve body biasing member S1 may be contained in the annular window 2c in advance before a process of mounting the piston 2 on the outer circumference of the small-diameter portion 3a of the piston rod 3. Then, they may be assembled together with the piston 2.

Since the ring 15 and the spacer 17 have different heights as seen from a lateral direction, the outer circumference of the annular plate 14 is warped downward. In this case, initial warping is given to the annular plate 14. Since the initial deflection is given in this manner, the annular plates 14 exert a biasing force to press the first valve body 10 toward the piston side, thereby causing the first valve body 10 to sit on the outer-circumferential valve seat 2e.

In the present embodiment, the first valve body biasing member B1 biases the first valve body 10 by means of the resilient force from the annular plates 14. In response to this biasing force, the first valve body biasing member B1 is subjected to the pressure inside the extension side chamber R1, which is applied to the first valve body 10 via the extension side ports 2a. In this case, the first valve body biasing member B1 sets a valve opening pressure, which refers to a difference in pressure between the extension side chamber R1 and the compression side chamber R2 when the first valve body 10 comes off the outer-circumferential valve seat 2e. The valve opening pressure can be adjusted by the number of annular plates 14 provided. In the present embodiment, three annular plates 14 are provided; however, the number of annular plates 14 provided can be changed as appropriate, depending on the required valve opening pressure.

As illustrated in FIG. 2, as the piston 2 is seen from a lateral direction orthogonal to the axial directions of the annular window 2c, the inner-circumferential valve seat 2d is disposed higher than the outer-circumferential valve seat 2e. Thus, when being subjected to the biasing force from the first valve body biasing member B1, the first valve body 10 seats on the outer-circumferential valve seat 2e, with its outer circumference being warped toward the piston 2, which corresponds to the upper side (in FIG. 2). Whereas the first valve body 10 is warped toward the second valve body 11 as described above, the second valve body 11 is biased toward the first valve body 10 by the second valve body biasing member S1. As a result, the second valve body 11 comes into contact with the piston side surface of the first valve body 10, thereby closing the holes 10a.

In an unloaded state where no pressure or fluid force is applied to both valve V1 and the piston 2 fixed to the piston rod 3, the second valve body 11 is in contact with the piston side surface of the first valve body 10 and thus tightly closes the holes 10a. In the present embodiment, the inner-circumferential valve seat 2d is disposed higher than the outer-circumferential valve seat 2e as seen from a lateral direction. However, even if the inner-circumferential valve seat 2d is disposed lower than or as high as the outer-circumferential valve seat 2e, the second valve body 11 is biased toward the first valve body 10 by the second valve body biasing member S1. As a result, the second valve body 11 can abut on the piston side surface of the first valve body 10 in the unloaded state, thereby reliably closing the holes 10a.

Even if the inner-circumferential valve seat 2d is disposed lower than or as high as the outer-circumferential valve seat 2e as seen from a lateral direction, the second valve body biasing member S1 can cause the second valve body 11 to reliably close the holes 10a. However, if the first valve body biasing member B1 biases the first valve body 10 toward the piston 2, the arrangement in which the inner-circumferential valve seat 2d is disposed higher than the outer-circumferential valve seat 2e as seen from a lateral direction can cause the second valve body 11 to tightly close the holes 10a.

When the inner-circumferential valve seat 2d is disposed lower than or as high as the outer-circumferential valve seat 2e in the piston 2, an annular shim, the outer diameter of which is smaller than that of the inner-circumferential valve seat 2d, may be disposed between the inner-circumferential valve seat 2d and the first valve body 10. In addition, the support position of the inner-circumferential side of the first valve body 10 may be set to be higher than that of the outer-circumferential valve seat 2e. In this way, the outer circumference of the first valve body 10 may be warped toward the piston 2 by the first valve body biasing member B1. In this case, by setting the plate thickness of the second valve body 11 to be larger than that of the shim, the second valve body 11 can be prevented from riding over the inner-circumferential valve seat 2d when sliding along the cylindrical surface 2h on the inner-circumferential side of the annular window 2c.

In the valve V1 configured above, even if the pressure inside the extension side chamber R1 exceeds that inside the compression side chamber R2, the first valve body 10 is kept to seat on the outer-circumferential valve seat 2e until the difference in pressure between the extension side chamber R1 and the compression side chamber R2 reaches the above valve opening pressure. In this state, the extension side chamber R1 communicates with the compression side chamber R2 via the fixed orifices 10b. As a result, the hydraulic oil inside the extension side chamber R1 flows to the compression side chamber R2 only through the fixed orifices 10b. Furthermore, the second valve body 11 is in contact with the first valve body 10 even in the unloaded state while being subjected to the pressure from the extension side chamber R1 via the extension side ports 2a. As a result, the second valve body 11 is kept in contact with the first valve body 10 and keeps closing the holes 10a leading to the orifices 12a. In this case, the hydraulic oil does not flow through the orifices 12a of the orifice valve body 12, so that the orifice 12a does not function. When other fixed orifices are also provided in the piston side valve 6 or the petal-type valve seat 2f, the hydraulic oil flows through the fixed orifices 10b as well as these fixed orifices, thereby moving from the extension side chamber R1 to the compression side chamber R2.

When the pressure inside the extension side chamber R1 exceeds that inside the compression side chamber R2 so that the difference in pressure between the extension side chamber R1 and the compression side chamber R2 reaches the valve opening pressure, the force of pushing the first valve body 10 exceeds the biasing force of the annular plates 14. As a result, the first valve body 10 becomes warped and comes off the outer-circumferential valve seat 2e, thereby opening the valve V1. When the valve V1 opens, the extension side ports 2a also open. The hydraulic oil then moves from the extension side chamber R1 to the compression side chamber R2 through an annular gap formed between the first valve body 10 and the outer-circumferential valve seat 2e. In this case, the second valve body 11 is biased by the second valve body biasing member S1 while being subjected to the pressure from the extension side chamber R1. The second valve body 11 then moves in a direction away from the piston 2 in response to the warping of the first valve body 10 while being kept in contact with the piston side surface of the first valve body 10. As a result, the second valve body 11 keep closing the holes 10a and does not cause the orifices 12a to function.

When the pressure inside the compression side chamber R2 exceeds that inside the extension side chamber R1, the valve V1 is pressed by the compression side chamber R2 acting from the back side. The first valve body 10 then comes into contact with the outer-circumferential valve seat 2e and closes the extension side ports 2a. When the pressure inside the compression side chamber R2 exceeds the pressure inside the extension side chamber R1, the pressure inside the compression side chamber R2 acts on the second valve body 11 via the orifices 12a, the arc-shaped holes 12b, the notch 13a, and the holes 10a. As a result, the second valve body 11 compresses the second valve body biasing member S1, thereby moving it to the bottom side of the annular window 2c. In this case, the second valve body 11 comes off the first valve body 10, opening the holes 10a. In short, when the pressure inside the compression side chamber R2 exceeds the pressure inside the extension side chamber R1, the compression side chamber R2 communicates with the extension side chamber R1 via the above fixed orifices 10b. In addition, the second valve body 11 opens the holes 10a, thereby also making the compression side chamber R2 communicate with the extension side chamber R1 via the orifices 12a.

As described above, when the pressure inside the extension side chamber R1 exceeds that inside the compression side chamber R2 but the difference in pressure therebetween is still small, the valve V1 allows the hydraulic oil to flow through the fixed orifices 10b. When the pressure inside the compression side chamber R2 exceeds that inside the extension side chamber R1 but the pressure difference is still small, the valve V1 allows the hydraulic oil to flow through the fixed orifices 10b and the orifices 12a. When the valve V1 configured above is in the unloaded state, the second valve body 11 is in contact with the first valve body 10 to reliably close the holes 10a. During the operation in which the hydraulic oil flows from the extension side chamber R1 to the compression side chamber R2, the valve V1 can block the orifices 12a, thereby causing each orifice 12a to reliably function as a unidirectional orifice.

Alternatively, each hole 10a in the first valve body 10 may function as an orifice, in which case the orifice valve body 12 may be optional. If it is not necessary to bias the first valve body 10, the first valve body biasing member B1 can also be optional. Furthermore, a shape and structure of the piston 2 serving as a valve seat member are not limited to those described above and can undergo design modifications as appropriate.

Figure 4:
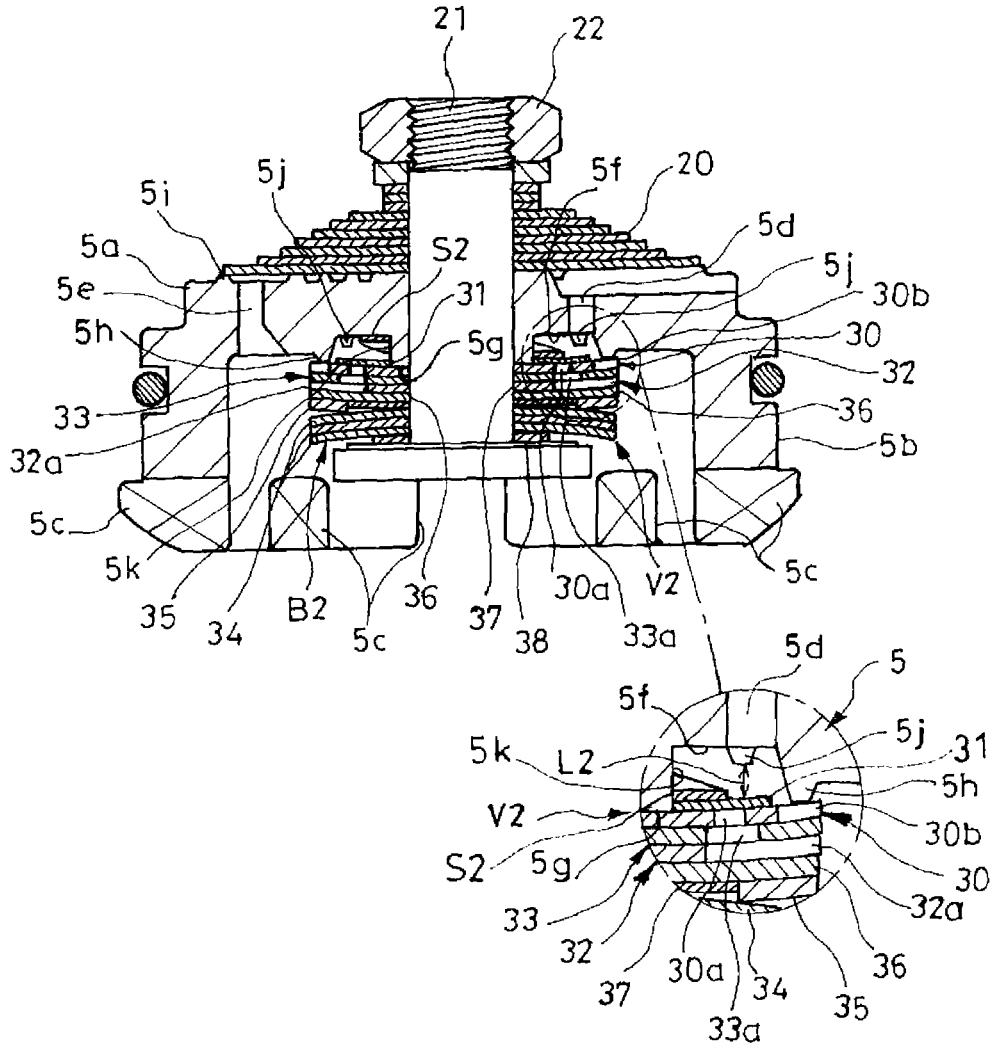
FIG. 4 is an enlarged cross-sectional view of a valve case that employs the valve according to the embodiment.

Next, the valve V2 will be described. As illustrated in FIGS. 1 and 4, the valve case 5, which has an annular shape, includes: a small-diameter portion 5a fitted to the lower end of the cylinder 1; a cylindrical skirt 5b provided on the outer circumference of the lower end; notches 5c that are provided in the skirt 5b and communicate with both an interior and outside of the skirt 5b; and damping ports 5d and the suction ports 5e, each of which serves as a port leading from a compression side chamber side (the upper side in FIG. 1) that faces the compression side chamber R2 to an opposite compression side chamber side that faces the interior of the skirt 5b.

In the present embodiment, the plurality of damping ports 5d are provided on the same circumference of the valve case 5; likewise, the plurality of suction ports 5e are provided on a circumference of a circle having a larger diameter than that of a circle in which the damping ports 5d are provided in the valve case 5. However, any number of ports may be provided; a single port may be provided.

The small-diameter portion 5a is fitted to the end of the cylinder 1. A lower side of the skirt 5b is then brought into contact with the bottom of the outer tube 4. In this way, the valve case 5 is fixed to the outer tube 4 by being pinched between the outer tube 4 and the cylinder 1. Further, the valve case 5 divides the compression side chamber R2 from the reservoir chamber R. Of each of the damping ports 5d and the suction ports 5e, an upper end opening faces the compression side chamber R2, and a lower end opening communicates with the reservoir chamber R through the notches 5c provided in the skirt 5b. Each of the damping ports 5d and the suction ports 5e makes the compression side chamber R2 communicate with the reservoir chamber R.

The valve case 5 serves as a valve seat member in the valve V2. Both of the valve V2 and the case side valve 20 are fixed to an outer circumference of a guide rod 21, which is inserted into an inner circumference of the valve case 5.

The valve case 5, which serves as the valve seat member, is provided with an annular window 5f, which is formed of an annular recess that communicates with an outlet end of each damping port 5d as a port on a reservoir chamber side end, which corresponds to the lower end (in FIG. 4). In addition, the valve case 5 is also provided with an annular inner-circumferential valve seat 5g on an inner-circumferential side of the annular window 5f at the lower end and an annular outer-circumferential valve seat 5h on an outer-circumferential side of the annular window 5f.

Figure 5:
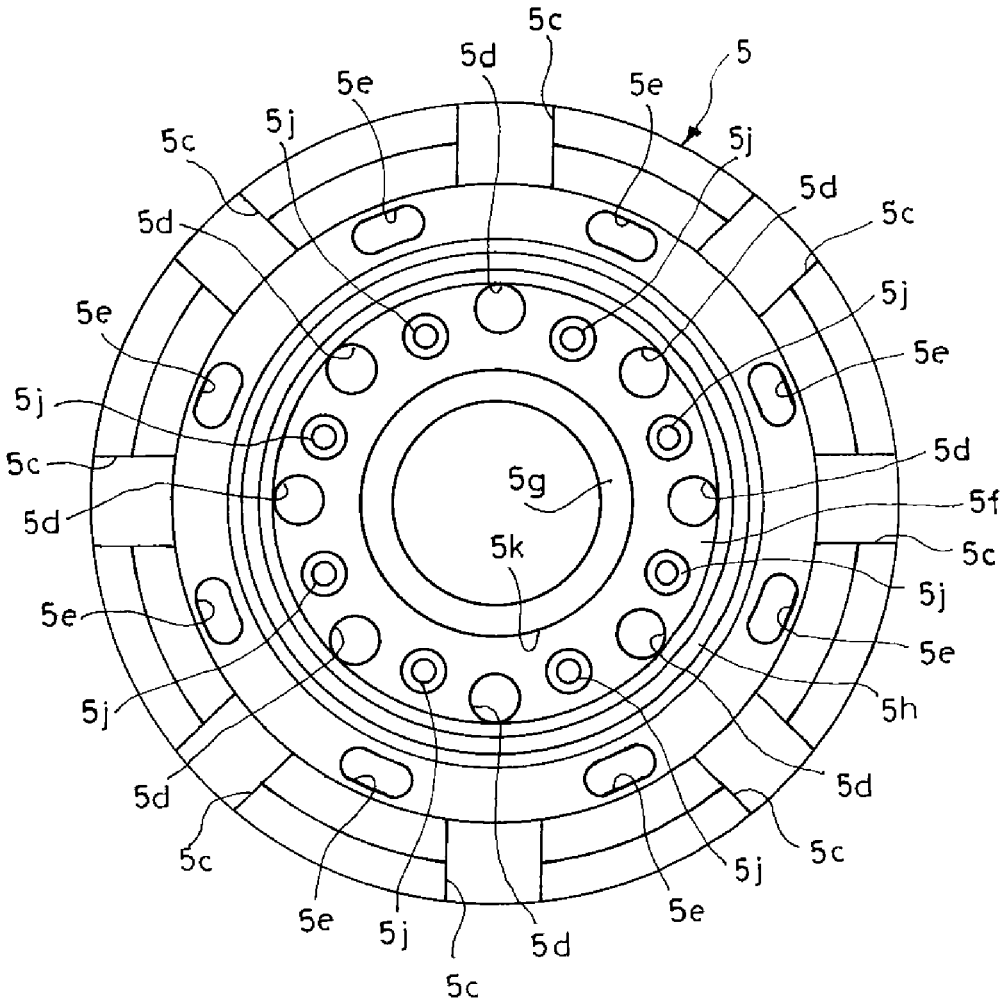
FIG. 5 is an enlarged bottom view of the valve case that employs the valve according to the embodiment.

As illustrated in FIG. 5, the valve case 5 is provided with regulating portions 5j, each of which is formed of a protrusion erected in an axial direction from a bottom of the annular window 5f at a position between corresponding damping ports 5d and 5d. As illustrated in FIGS. 4 and 5, the inner-circumferential side surface of the annular window 5f in the valve case 5 is formed as a cylindrical surface 5k, the center of which is aligned with an axial center of the annular window 5f.

As the valve case 5 is seen from a lateral direction (direction orthogonal to an axial direction of the valve case 5) as illustrated in FIG. 4, when both heights of the inner-circumferential valve seat 5g and the outer-circumferential valve seat 5h provided on the lower side of the valve case 5 are compared, the inner-circumferential valve seat 5g is disposed higher than the outer-circumferential valve seat 5h. As illustrated in FIG. 4, the lower side of the inner-circumferential valve seat 5g is positioned on the reservoir chamber R side, which is lower than the lower side (in FIG. 4) of the outer-circumferential valve seat 5h. Thus, a height difference is secured between the inner-circumferential valve seat 5g and the outer-circumferential valve seat 5h.

The valve case 5 is provided with petal-type valve seats 5i that independently surround the upper end openings of the respective suction ports 5e, which correspond to outlet ends thereof. The outlet ends of the suction ports 5e independently open at the upper side of the valve case 5 without communicating with one another. The inlet end of each damping port 5d communicates with the compression side chamber R2 via a gap between portions of adjacent petal-type valve seats 5i which surrounds corresponding suction ports 5e.

The case side valve 20 is formed by stacking a plurality of annular plates on a compression side chamber side of the valve case 5, which corresponding to the upper side (in FIG. 4) thereof. The case side valve 20 has an inner circumference as a fixed side and an outer-circumferential side permitted to be warped. When the pressure inside the reservoir chamber R exceeds that inside the compression side chamber R2, the case side valve 20 is subjected to the pressure from the reservoir chamber R via the suction ports 5e, thereby becoming warped. In response, the case side valve 20 comes off the petal-type valve seats 5i to open each suction port 5e, thereby making the reservoir chamber R communicate with the compression side chamber R2. When the pressure inside the compression side chamber R2 exceeds that inside the reservoir chamber R, the case side valve 20 is pressed by the compression side chamber R2 acting from the back side and then brought into contact with each petal-type valve seat 5*i*. In response, each suction port 5*e* closes to shut off the communication between the compression side chamber R2 and the reservoir chamber R. In short, the case side valve 20 functions as a check valve that opens or closes each suction port 5*e* by seating on or coming off the petal-type valve seats 5*i*.

The valve case 5 is provided with the valve V2 on its reservoir chamber side, which corresponds to a lower side (in FIG. 4) thereof. The valve V2 includes: a first valve body 30 that has an annular plate shape, is stacked in the valve case 5 with its inner circumference immovably fixed, can seat on or come off the outer-circumferential valve seat 5*h* to open or close the annular window 5*f*, and has holes 30*a* facing the annular window 5*f*; a second valve body 31 that has an annular plate shape, is contained in the annular window 5*f* so as to be movable in axial directions, and closes the holes 30*a* when abutting on a valve seat member side surface of the first valve body 30; an orifice valve body 32 that is stacked on an opposite valve seat member side of the first valve body 30 and acts as a throttle valve body having orifices 32*a* as throttles leading to the holes 30*a*; a first valve body biasing member B2 that biases the first valve body 30 toward the piston 2; a second valve body biasing member S2 that is contained in the annular window 5*f* and biases the second valve body 31 toward the first valve body 30; the regulating portions 5*j* that restrict a movement of the second valve body 31 in a direction away from the first valve body 30 when the second valve body 31 moves a predetermined distance or more away from the first valve body 30; and a communication passage that secures the communication between the holes 30*a* and the damping ports 5*d* acting as ports even when the second valve body 31 abuts on the regulating portions 5*j*. The valve V2 has substantially the same configuration as the valve V1, except that the valve seat member is formed of the valve case 5.

The configurations of the first valve body 30, the second valve body 31, the orifice valve body 32, and the first valve body biasing member B2 in the valve V2 are similar to, respectively, those of the first valve body 10, the second valve body 11, the orifice valve body 12, and the first valve body biasing member B1 in the valve V1. Therefore, of the components in the valve V2, those the same as in the valve V1 will not be described in detail; otherwise, the description may be duplicated. Accordingly, only the components in the valve V2 which are different from any component in the valve V1 will be described in detail.

As illustrated in FIG. 4, the first valve body 30, which has an annular plate shape similar to that of the first valve body 10, has an inner circumference immovably fixed to the valve case 5 and an outer-circumferential side permitted to be warped. This outer-circumferential side opens or closes the damping ports 5*d* by seating on or coming off the outer-circumferential valve seat 5*h*. The first valve body 30 is provided with the plurality of holes 30*a* arranged in a circumferential direction at positions facing the annular window 5*f* and further provided with the plurality of fixed orifices 30*b* formed as notches on the outer circumference. Thus, when the first valve body 30 seats on the outer-circumferential valve seat 5*h*, each damping port 5*d* communicates with the reservoir chamber R via the fixed orifices 30*b*.

The second valve body 31 is disposed on the valve case 5 side of the first valve body 30. As illustrated in FIG. 4, the second valve body 31 has an annular plate shape, the outer diameter of which is smaller than the inner diameter of the outer-circumferential valve seat 5*h* and is a diameter large enough to open or close the holes 30*a*. The second valve body 31 is contained in the annular window 5*f* and is movable in the axial directions while being guided by the cylindrical surface 5*k* by bringing the inner circumference into slidable contact with an outer circumference of the cylindrical surface 5*k* on the inner-circumferential side of the annular window 5*f*. In short, the second valve body 31 is positioned inside the annular window 5*f* in the radial directions relative to the valve case 5 by the cylindrical surface 5*k* of the annular window 5*f*. In addition, the second valve body 31 faces the holes 30*a* of the first valve body 30 in the axial directions and can be guided by the cylindrical surface 5*k* to move in the axial directions without axial displacements.

An annular wave washer is disposed, as the second valve body biasing member S2, between the second valve body 31 and the bottom of the annular window 5*f*. The second valve body biasing member S2 biases the second valve body 31 toward the first valve body 30 and, in a no-load state where no pressure is applied, brings the second valve body 31 into contact with the first valve body 30. When abutting on the first valve body 30, the second valve body 31 closes the holes 30*a*.

The outer diameter of the second valve body 31 is set to a diameter larger enough for the second valve body 31 to axially face the regulating portions 5*j* erected from between the damping ports 5*d*, 5*d* on the bottom of the annular window 5*f*. Thus, when the second valve body 31 moves toward the first valve body 30 in the annular window 5*f* to come into contact with the valve case side surface of the first valve body 30, the second valve body 31 closes the holes 30*a*. When the second valve body 31 comes off the first valve body 30 and moves toward the valve case 5 by a predetermined distance L2 or more inside the annular window 5*f*, the outer circumference of the second valve body 31 abuts on the regulating portions 5*j*, so that the further movement of the second valve body 31 toward the valve case 5 is restricted. As illustrated in FIG. 3, the second valve body 31 is provided with a plurality of notches 31*a* on its inner circumference. Thus, when coming off the first valve body 30, the second valve body 31 makes a space on a piston 2 side of the second valve body 31, which corresponds to the upper side (in FIG. 4) thereof, communicate with a space on a first valve body 30 side of the first valve body 30, which corresponds to the lower side (in FIG. 4) thereof, via the outer circumference as well as the notches 31*a* on the inner-circumferential side. This is similar to the second valve body 11.

When the second valve body 31 abuts on the regulating portions 5*j*, the second valve body 31 is supported by the regulating portions 5*j*, each of which is formed of a projection, while being spaced apart from the bottom of the annular window 5*f* with a gap therebetween. As a result, the second valve body 31 does not close the outlet end of each damping port 5*d*. The hydraulic oil can flow from the damping ports 5*d* toward the holes 30*a* via the notches 31*a* on the inner-circumferential side of the second valve body 31 and the outer circumference. Thus, even when the second valve body 31 abuts on the regulating portions 5*j*, the flow path area in the flow path from the damping ports 5*d* to the holes 30*a* does not decrease. In the valve V2 according to the present embodiment, as described above, the notches 31*a* on the inner circumference of the second valve body 31 and gaps between the projections that form the regulating portion 5j function as communication passages via which the damping ports 5d communicate with the holes 30a even when the second valve body 31 abuts on the regulating portions 5j. Since each regulating portion 5j configured in this manner is formed of a projection, not an annular member, provided in the annular window 5f at some intervals in a circumferential direction, the flow path area can be secured as a communication passage even when the second valve body 31 abuts on the regulating portion 5j. As described above, the second valve body 31 does not necessarily have to be provided with the notches 31a or holes that function as the communication passage if the flow path area can be secured at another place as the communication passage.

As illustrated in FIG. 4, the orifice valve body 32 is provided on an opposite valve case side of the first valve body 30 according to the present embodiment. The orifice valve body 32 has an annular plate shape, the outer diameter of which is as large as that of the first valve body 30. In addition, the orifice valve body 32 has an inner circumference as a fixed side and an outer circumference permitted to be warped together with the first valve body 30. As illustrated in FIG. 3, the orifice valve body 32 includes: four arc-shaped holes 32b arranged on the same circumference; and four orifices 32a that are open on the outer circumference and lead to the corresponding arc-shaped holes 32b.

In the valve V2 according to the present embodiment, as illustrated in FIG. 4, an annular disc 33, the outer diameter of which is as large as that of the first valve body 30, is disposed between the first valve body 30 and the orifice valve body 32, similar to the valve V1. As illustrated in FIG. 3, the disc 33 is provided with a C-shaped notch 33a, which faces the holes 30a in the first valve body 30 and the arc-shaped holes 32b in the orifice valve body 32 and makes the holes 30a communicate with the arc-shaped holes 32b. Similar to the disc 13 in the valve V1, the disc 33 is provided to increase the degree of communication between the holes 30a and the arc-shaped holes 32b, independently of the relative positions of the first valve body 30 and the orifice valve body 32 in a circumferential direction; however, it may be optional.

Similar to the first valve body biasing member B1 in the valve V1, the first valve body biasing member B2 in the valve V2 includes: a plurality of annular plates 34 each of which has elasticity and is disposed on the opposite valve case side of the first valve body 30; a ring 35 that has an annular plate shape and is disposed between the first valve body 30 and each annular plate 34; a ring holding ring 36 that holds the ring 35, and a spacer 37 that has an annular plate shape and has a thickness smaller than that of the ring 35 disposed on the inner-circumferential side of the ring 35. They are all stacked on the opposite valve case side of the orifice valve body 32.

An annular spacer 38, the outer diameter of which is smaller than that of the annular plate 34, is stacked on the opposite valve case side of the annular plate 34 in the first valve body biasing member B2. The case side valve 20, the valve case 5, the first valve body 30, the disc 33, the orifice valve body 32, the ring holding ring 36 equipped with the ring 35, the spacer 37, the three annular plates 34, and the spacer 38 are mounted in this order on the outer circumference of a guide rod 21 fitted into the inner circumference of the valve case 5. They are then fixed to the guide rod 21 by a nut 22 screwed to an end of the guide rod 21. When fixed by screwing the nut 22 to the guide rod 21, the case side valve 20, the second valve body 31, the first valve body 30, the disc 33, the orifice valve body 32, the ring holding ring 36, the spacer 37, and the annular plate 34 are fixed to the guide rod 21, with their inner circumferences being fixed and their outer circumferences being permitted from being warped. In this case, both of the second valve body 31 and the second valve body biasing member S2 may be contained in the annular window 5f in advance before a process of mounting the valve case 5 on the outer circumference of the guide rod 21. Then, they may be assembled together with the valve case 5.

As described above, the first valve body biasing member B2, the inner circumference of which is immovably fixed to the valve case 5, exerts a biasing force to press the first valve body 30 to the valve case side by means of the resilient force, which is exerted by the annular plate 34 to which the initial deflection is given by each ring 35 and the spacer 37 having different plate thicknesses. This causes the first valve body 30 to sit on the outer-circumferential valve seat 5h. Similar to the first valve body biasing member B1, the first valve body biasing member B2 is subjected to the pressure inside the compression side chamber R2, which is applied to the first valve body 30 via the damping ports 5d. In this case, the first valve body biasing member B2 sets a valve opening pressure, which refers to a difference in pressure between the compression side chamber R2 and the reservoir chamber R when the first valve body 30 comes off the outer-circumferential valve seat 5h.

As illustrated in FIG. 4, as the valve case 5 is seen from a lateral direction orthogonal to the axial directions of the annular window 5f, the inner-circumferential valve seat 5g is disposed higher than the outer-circumferential valve seat 5h. Thus, when being subjected to the biasing force from the first valve body biasing member B2, the first valve body 30 seats on the outer-circumferential valve seat 5h, with its outer circumference being warped toward the valve case 5, which corresponds to the upper side (in FIG. 4). Whereas the first valve body 30 is warped toward the second valve body 31 as described above, the second valve body 31 is biased toward the first valve body 30 by the second valve body biasing member S2. As a result, the second valve body 31 comes into contact with the piston side surface of the first valve body 30, thereby closing the holes 30a. In an unloaded state where no pressure or fluid force is applied to both valve V2 and the valve case 5 fixed to the guide rod 21, the second valve body 31 is in contact with the valve case surface of the first valve body 30 and thus tightly closes the holes 30a.

In the present embodiment, the inner-circumferential valve seat 5g is disposed higher than the outer-circumferential valve seat 5h as seen from a lateral direction. However, even if the inner-circumferential valve seat 5g is disposed lower than or as high as the outer-circumferential valve seat 5h, the second valve body 31 is biased toward the first valve body 30 by the second valve body biasing member S2. As a result, the second valve body 31 can abut on the piston side surface of the first valve body 30 in the unloaded state, thereby reliably closing the holes 30a, as in the case with the valve V1.

In the valve V2 configured above, even if the pressure inside the compression side chamber R2 exceeds that inside the reservoir chamber R, the first valve body 30 is kept to seat on the outer-circumferential valve seat 5h until the difference in pressure between the compression side chamber R2 and the reservoir chamber R reaches the above valve opening pressure. In this state, the compression side chamber R2 communicates with the reservoir chamber R via the fixed orifices 30b. As a result, the hydraulic oil inside the compression side chamber R2 flows to the reservoir chamber R only through the fixed orifices 30b. Furthermore, the second valve body 31 is in contact with the first valve body 30 even in the unloaded state due to the biasing force from the second valve body biasing member S2 while being subjected to the pressure from the compression side chamber R2 via the damping ports 5d. As a result, the second valve body 31 is kept in contact with the first valve body 30 and keeps closing the holes 30a leading to the orifices 32a. In this case, the hydraulic oil does not flow through the orifices 32a of the orifice valve body 32, so that the orifice 32a does not function.

When the pressure inside the compression side chamber R2 exceeds that inside the reservoir chamber R so that the difference in pressure between the compression side chamber R2 and the reservoir chamber R reaches the valve opening pressure, the force of pushing the first valve body 30 exceeds the biasing force generated by the annular plates 34. As a result, the first valve body 30 becomes warped and comes off the outer-circumferential valve seat 5h, thereby opening the valve V2. When the valve V2 opens, the damping ports 5d also open. The hydraulic oil then moves from the compression side chamber R2 to the reservoir chamber R through an annular gap formed between the first valve body 30 and the outer-circumferential valve seat 5h. Since the second valve body 31 is warped together with the first valve body 30 under the pressure from the compression side chamber R2, the second valve body 31 is kept in contact with the valve case side surface of the first valve body 30 to close the holes 30a, thereby suppressing the orifices 32a from functioning.

When the pressure inside the reservoir chamber R exceeds that inside the compression side chamber R2, the valve V2 is pressed by the reservoir chamber R acting from the back side. The first valve body 30 then comes into contact with the outer-circumferential valve seat 5h and closes the damping ports 5d. When the pressure inside the reservoir chamber R exceeds that inside the compression side chamber R2, the pressure inside the reservoir chamber R acts on the second valve body 31 via the orifices 32a, the arc-shaped holes 32b, the notch 33a, and the holes 30a. As a result, the second valve body 31 compresses the second valve body biasing member S2, thereby moving it to the bottom side of the annular window 5f. In this case, the second valve body 31 comes off the first valve body 30, opening the holes 30a. Thus, when the pressure inside the reservoir chamber R exceeds that inside the compression side chamber R2, the reservoir chamber R communicates with the compression side chamber R2 via the fixed orifices 30b described above. In addition, the second valve body 31 opens the holes 30a, thereby also making the reservoir chamber R communicate with the compression side chamber R2 via the orifices 32a.

As described above, when the pressure inside the compression side chamber R2 exceeds that inside the reservoir chamber R but the difference in pressure therebetween is still small, the valve V2 allows the hydraulic oil to flow through the fixed orifices 30b. When the pressure inside the compression side chamber R2 exceeds that inside the reservoir chamber R but the difference in pressure is still small, the valve V2 allows the hydraulic oil to flow through the fixed orifices 30b and the orifices 32a. When the valve V2 configured above is in the unloaded state, the second valve body 31 is in contact with the first valve body 30 to reliably close the holes 30a. During the operation in which the hydraulic oil flows from the compression side chamber R2 to the reservoir chamber R, the valve V2 can block the orifices 32a, thereby causing each orifice 32a to reliably function as a unidirectional orifice.

Alternatively, each hole 30a in the first valve body 30 may function as an orifice, in which case the orifice valve body 32 may be optional. If it is not necessary to bias the first valve body 30, the first valve body biasing member B2 can also be optional. Furthermore, a shape and structure of the valve case 5 that serves as a valve seat member are not limited to those described above and can undergo design modifications as appropriate.

Figure 6:
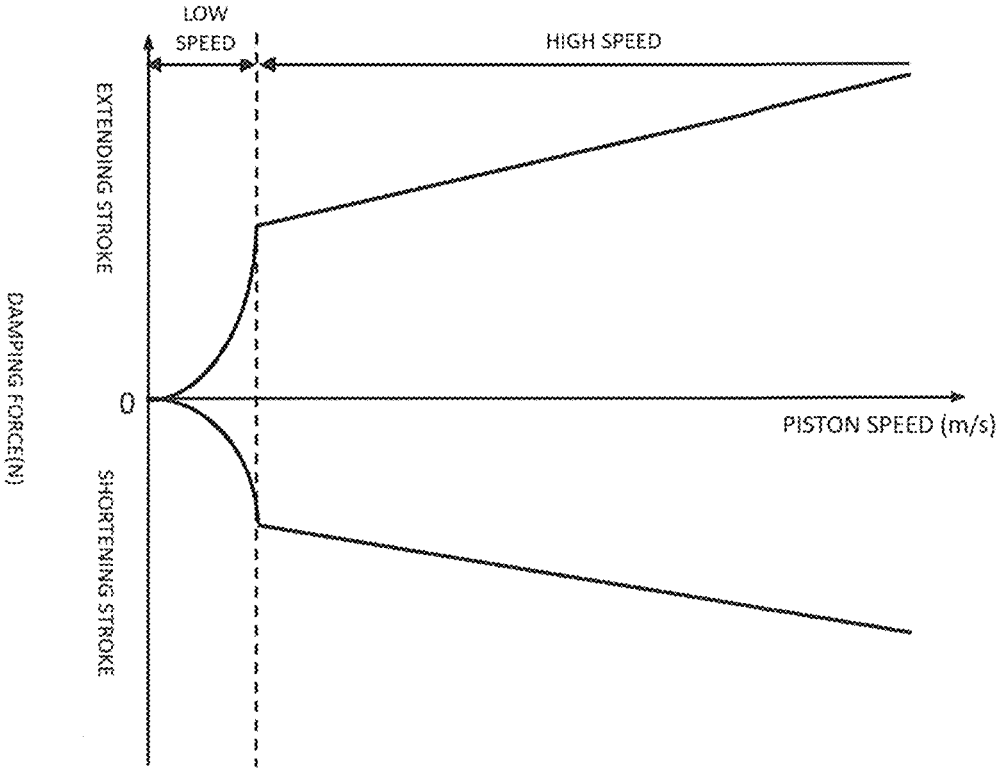
FIG. 6 is a diagram of damping force characteristics of the shock absorber according to the embodiment.

The valves V1 and V2 and the shock absorber D are configured as described above. Continuing to this, actions of the shock absorber D according to the present embodiment will be described. First, a case where the shock absorber D extends will be described. When the shock absorber D performs an extending stroke by causing the piston 2 to move to the upper side (in FIG. 1) relative to cylinder 1, the extension side chamber R1 is compressed, and the compression side chamber R2 is expanded. When the piston speed, which corresponds to the moving speed of the piston 2 relative to the cylinder 1, is low, the pressure inside the extension side chamber R1 is higher than that inside the compression side chamber R2, but the difference in pressure between the extension side chamber R1 and the compression side chamber R2 does not reach the valve opening pressure of the first valve body 10. As a result, the first valve body 10 in the valve V1 is maintained in a state where it seats on the outer-circumferential valve seat 2e, so that the hydraulic oil moves from the extension side chamber R1 to the compression side chamber R2 through the fixed orifices 10b. Therefore, when the piston speed is within the low-speed range in the extending stroke, the shock absorber D exerts a damping force with the fixed orifices 10b and thus exerts the damping force having a property proportional to the square of the piston speed peculiar to the orifices, as illustrated in FIG. 6.

Since the piston rod 3 exits from the interior of the cylinder 1 in the extending stroke of the shock absorber D, the amount of hydraulic oil which is equivalent to the volume of the piston rod 3 exiting from the cylinder 1 becomes insufficient inside the cylinder 1. When the piston speed is low, the difference in pressure between the reservoir chamber R and the compression side chamber R2 is small, so that the case side valve 20 provided in the valve case 5 does not open, but the second valve body 31 in the valve V2 is warped to open the holes 30a. In this case, the amount of hydraulic oil which is equivalent to the insufficient volume inside the cylinder 1 is supplied from the reservoir chamber R into the cylinder 1 via the fixed orifices 30b and the orifices 32a. In short, when the shock absorber D extends at a low piston speed, the fixed orifices 30b as well as the orifices 32a become effective.

After the piston speed has increased during the extending stroke to increase the difference in pressure between the extension side chamber R1 and the compression side chamber R2, when the difference in pressure therebetween reaches the valve opening pressure of the first valve body 10, the force of pushing the first valve body 10 overcomes the biasing force of the first valve body biasing member B1. As a result, the first valve body 10 becomes warped and comes off the outer-circumferential valve seat 2e, opening the extension side ports 2a. In response, the hydraulic oil flows through an annular gap appearing between the first valve body 10 and the outer-circumferential valve seat 2e and moves from the extension side chamber R1 to the compression side chamber R2. Since the difference in pressure between the reservoir chamber R and the compression side chamber R2 increases, the case side valve 20 provided in the valve case 5 opens, opening the suction ports 5e. Thus, the amount of hydraulic oil which is equivalent to the insufficient volume inside the cylinder 1 flows through the suction ports 5e and is thereby supplied from the reservoir chamber R into the cylinder 1. Therefore, when the piston speed is within the high-speed range in the extending stroke, the shock absorber D exerts the damping force, based on the resistance given to the flow of the hydraulic oil by the first valve body 10 and thus exerts the damping force having a property proportional to the piston speed, as illustrated in FIG. 5.

When the piston speed is within the low-speed range in the extending stroke, the second valve body 31 opens to cause the hydraulic oil flowing from the reservoir chamber R toward the compression side chamber R2 to pass through both the fixed orifices 30b and the orifices 32a. Consequently, it is possible to secure a large flow path area by opening the second valve body 31. Even when the second valve body 31 moves to the bottom of the annular window 5f in response to the opening of the second valve body 31, the movement of the second valve body 31 to the bottom is restricted by the regulating portions 5j, and the damping ports 5d are not blocked. The communication between the orifices 32a and the damping ports 5d is secured by the communication passage in the valve V2. Thus, the second valve body 31 does not give unnecessary resistance to the flow of the hydraulic oil. When the piston speed reaches the high-speed range, the case side valve 20 opens, opening the suction ports 5e. However, it is possible to suppress pressure fluctuations inside the compression side chamber R2 because it is possible to decrease the degree of change in the flow path area before and after the opening of the case side valve 20.

Second, a case where the shock absorber D shortens will be described. When the shock absorber D performs a shortening stroke by causing the piston 2 to move to a lower side (in FIG. 1) of the cylinder 1, the compression side chamber R2 is compressed, and the extension side chamber R1 is expanded. When the piston speed is low, the pressure inside the compression side chamber R2 exceeds that inside the extension side chamber R1, but the difference in pressure between the compression side chamber R2 and the extension side chamber R1 is small. In this case, the piston side valve 6 does not open, but the second valve body 11 in the valve V1 becomes warped, opening the holes 10a. As a result, the hydraulic oil flowing from the compression side chamber R2 to the extension side chamber R1 moves through the fixed orifices 10b and the orifices 12a. In short, when the shock absorber D shortens at a low piston speed, the fixed orifices 10b as well as the orifices 12a becomes effective.

Since the piston rod 3 is inserted into the cylinder 1 during the shortening stroke of the shock absorber D, the amount of hydraulic oil which is equivalent to the volume of the piston rod 3 inserted into the cylinder 1 becomes excessive inside the cylinder 1. When the piston speed is low, the difference in pressure between the compression side chamber R2 and the reservoir chamber R is small. In response, the first valve body 30 in the valve V2 does not open, so that the hydraulic oil moves from the compression side chamber R2 to the reservoir chamber R via the fixed orifices 30b. Therefore, when the piston speed is within the low-speed range in the shortening stroke, the shock absorber D exerts a damping force with the fixed orifices 30b and thus exerts the damping force having a property proportional to the square of the piston speed peculiar to the orifices, as illustrated in FIG. 6.

After the piston speed has increased during the shortening stroke to increase the difference in pressure between the compression side chamber R2 and the reservoir chamber R, when the difference in pressure therebetween reaches the valve opening pressure of the first valve body 30, the force of pushing the first valve body 30 overcomes the biasing force generated by the first valve body biasing member B2. As a result, the first valve body 30 becomes warped and comes off the outer-circumferential valve seat 5h, opening the damping ports 5d. In response, the hydraulic oil flows through an annular gap appearing between the first valve body 30 and the outer-circumferential valve seat 5h and moves from the compression side chamber R2 to the reservoir chamber R. Furthermore, since the difference in pressure between the compression side chamber R2 and the extension side chamber R1 increases, the piston side valve 6 provided in the piston 2 opens, opening the compression side ports 2b. Therefore, when the piston speed is within the high-speed range in the shortening stroke, the shock absorber D exerts the damping force due to the resistance that the first valve body 30 gives to the flow of the hydraulic oil and thus exerts the damping force having a property proportional to the piston speed, as illustrated in FIG. 6.

When the piston speed is within the low-speed range in the shortening stroke, the second valve body 11 opens to cause the hydraulic oil flowing from the compression side chamber R2 toward the extension side chamber R1 to pass through both the fixed orifices 10b and the orifices 12a. Consequently, it is possible to secure a large flow path area by opening the second valve body 11. Even when the second valve body 11 moves to the bottom of the annular window 2c in response to the opening of the second valve body 11, the movement of the second valve body 31 to the bottom is restricted by the regulating portion 2g, and the extension side ports 2a are not blocked. The communication between the orifices 12a and the extension side ports 2a is secured by the communication passage (notches 11a) in the valve V1. Thus, the second valve body 11 does not give unnecessary resistance to the flow of the hydraulic oil. When the piston speed reaches the high-speed range, the piston side valve 6 opens, opening the compression side ports 2b. However, it is possible to suppress pressure fluctuations inside the extension side chamber R1 because it is possible to decrease the degree of change in the flow path area before and after the opening of the piston side valve 6.

A shock absorber D, as described above, includes: a cylinder 1; a piston 2 that is movably inserted into the cylinder 1 and divides an interior of the cylinder 1 into an extension side chamber R1 and a compression side chamber R2; a piston rod 3 that is inserted into the cylinder 1 and coupled to the piston 2; an outer tube 4 that covers the cylinder 1 and forms a reservoir chamber R between the outer tube 4 and the cylinder 1; a valve case 5 that is provided at an end of the cylinder 1 and divides the compression side chamber R2 from the reservoir chamber R; a piston side valve 6 that is provided on an extension side chamber R1 side of the piston 2 and opens or closes a compression side port 2b provided in the piston 2; a case side valve 20 that is provided on a compression side chamber R2 side of the valve case 5 and opens or closes a suction port 5e provided in the valve case 5; a valve V1 disposed on a compression side chamber R2 side of the piston 2; and a valve V2 disposed on a reservoir chamber R side of the valve case 5.

The shock absorber D configured above can suppress pressure inside the compression side chamber R2 from fluctuating before and after opening of the case side valve 20 during an extending stroke. Also, the shock absorber D configured above can suppress pressure inside the extension side chamber R1 from fluctuating before and after opening of the piston side valve 6 during a shortening stroke. Therefore, the shock absorber D configured above can reliably close an orifice 12a, 32a, which serves as a throttle, even in an unloaded state, thereby successfully suppressing generation of abnormal noise. If being applied to a suspension of a vehicle, the shock absorber D can improve ride quality in the vehicle.

In the case where the valve V1 is provided on the compression side chamber R2 side of the piston 2 and the valve case 5 is provided with a leaf valve instead of the valve V2, it is possible to suppress pressure fluctuations inside the extension side chamber R1 before and after the opening of the piston side valves 6 during the shortening stroke of the shock absorber D, thereby successfully preventing generation of abnormal noise. If a problem is less likely to arise in which abnormal noise is generated during the extending stroke of the shock absorber D, the valve V1 may be provided only on the compression side chamber R2 side of the piston 2 as described above. Furthermore, in the case where the valve V2 is provided on the reservoir chamber R side of the valve case 5 and the piston 2 is provided with a leaf valve instead of the valve V1, it is possible to suppress pressure fluctuations in the compression side chamber R2 before and after the opening of the case side valve 20 during the extending stroke of the shock absorber D and to prevent generation of abnormal noise. If a problem is less likely to arise in which abnormal noise is generated during the shortening stroke of the shock absorber D, the valve V2 may be provided only on the reservoir chamber R side of the valve case 5 as described above.

A valve V1, V2 of the present invention includes: a valve seat member (piston 2, valve case 5) that has a port (extension side port 2a, damping port 5d), an annular window 2c, 5f which communicates with an outlet end of the port (extension side port 2a, damping port 5d), an inner-circumferential valve seat 2d, 5g provided on an inner-circumferential side of the annular window 2c, 5f, and an outer-circumferential valve seat 2e, 5h of the annular window 2c, 5f; a first valve body 10, 30 that has an annular plate shape, that are stacked on a valve seat member (Piston 2, Valve case 5) with an inner circumference thereof fixed, that can seat on or come off the outer-circumferential valve seat 2e, 5h to open or close the annular window 2c, 5f, and that has a hole 10a, 30a which faces the annular window 2c, 5 f and which forms a passage communicating with an orifice (throttle) or an orifice (throttle) 12a, 32a; a second valve body 11, 31 that has an annular plate shape, that is contained in the annular window 2c, 5f so as to be movable in an axial direction, and that closes the hole 10a, 30a when abutting on a valve seat member side surface of the first valve body 10, 30; a second valve body biasing member S1, S2 that is contained in the annular window 2c, 5f and that biases the second valve body 11, 31 toward the first valve body 10, 30; a regulating portion 2g, 5j that, when the second valve body 11, 31 moves a predetermined distance or more away from the first valve body 10, 30, restricts a movement of the second valve body 11, 31 in a direction in which the second valve body 11, 31 moves away from the first valve body 10, 30; and a communication passage that secures communication between the hole 10a, 30a and the port (extension side port 2a, damping port 5d) even when the second valve body 11, 31 abuts on the regulating portion 2g, 5j.

In the valve V1, V2 configured above, the second valve body 11, 31 is biased toward the first valve body 10, 30 by the second valve body biasing member S1, S2. When abutting the first valve body 10, 30, the second valve body 11, 31 closes the hole 10a, 30a. Accordingly, a valve opening pressure at which the second valve body 11, 31 opens the hole 10a, 30a is set only by a spring constant of the second valve body biasing member S1, S2, independently of rigidity of the second valve body 11, 31. With the valve V1, V2 according to the present embodiment, the second valve body biasing member S1, S2 can be downsized. In this case, even if the rigidity of the second valve body 11, 31 is enhanced to increase the durability against the pressure acting on the second valve body 11, 31, the valve opening pressure of the second valve body 11, 31 does not increase.

With the valve V1, V2 according to the present embodiment, the durability of the second valve body 11, 31 can be improved while the second valve body 11, 31 is apart from the first valve body 10, 30 with a sufficient gap therebetween during the opening of the hole 10a, 30a. As a result, the second valve body 11, 31 does not give unnecessary resistance to a flow of hydraulic oil. It is therefore possible to suppress the second valve body 11, 31 from adding an unnecessary damping force to a damping force generated in the orifice (throttle) 12a, 32a.

As described above, the valve V1, V2 according to the present embodiment can attenuate the damping force. Therefore, the valve V1, V2 does not unnecessarily vibrate a vehicle body equipped with the shock absorber D that employs the valve V1, V2, thereby successfully improving ride quality in the vehicle.

With the valve V1, V2 according to the present embodiment, the second valve body 11, 31 and the second valve body biasing member S1, S2 can be provided without increasing an entire length of the valve V1, V2. This is because both the second valve body 11, 31 and the second valve body biasing member S1, S2 are contained in the annular window 2c, 5f.

The valve V1, V2 according to the present embodiment reduces the risk of damping characteristics of the shock absorber D changing during extending or shortening of the shock absorber D at a low speed. This is because the second valve body 11, 31 can abut on the first valve body 10, 30 to close the hole 10a, 30a even in the unloaded state. Thus, a situation is less likely to occur, in which the second valve body 11, 31 closes behind the flow of the hydraulic oil from the port (extension side port 2a, damping port 5d) toward the orifice (throttle) 12a, 32a, causing the hydraulic oil to flow through the orifice (throttle) 12a, 32a.

If the valve V1, V2 configured above is applied to the shock absorber D, the orifice (throttle) 12a, 32a can be set as a unidirectional orifice (throttle), which functions only during an extending stroke or a shortening stroke of the shock absorber D. It is therefore possible to independently set the damping force characteristics of the shock absorber D in the extending stroke and the damping force characteristics thereof in the shortening stroke.

Furthermore, in the valves V1 and V2 according to the present embodiment, an inner-circumferential side surface of the annular window 2c, 5f is formed by a cylindrical surface 2h, 5k, the center of which is aligned with on an axial center of the annular window 2c, 5f. In addition, the second valve body 11, 31 has an inner circumference that is slidably in contact with the cylindrical surface 2h, 5k. As a result, the cylindrical surfaces 2h, 5k guides the valve seat member (piston 2, valve case 5) to move in the axial direction. With the valve V1, V2 configured above, the second valve body 11, 31 is simply attached to the valve seat member (piston 2, valve case 5), whereby the second valve body 11, 31 can be positioned relative to the valve seat member (piston 2, valve case 5) in a radial direction. Then, the second valve body 11, 31 can be made to face the hole 10*a*, 30*a* of the first valve body 10, 30 in the axial direction. As a result, the second valve body 11, 31 can close the hole 10*a*, 30*a* when abutting on the first valve body 10, 30, without aligning the second valve body 11, 31.

In the valve V1, V2 according to present embodiment, the second valve body 11, 31 has an inner circumference having one or more notches 11*a*, 31*a*. In addition, a part or whole of the communication passage is formed by the notches 11*a*, 31*a*. In the valve V1, V2 configured above, when the second valve body 11, 31 moves away from the first valve body 10, 30, the hydraulic oil that has flowed from the orifice 12*a*, 32*a* through the holes 10*a*, 30*a* can move to the port (extension side port 2*a*, damping port 5*d*) through the outer-circumferential side of the second valve body 11, 31 as well as the notches 11*a*, 31*a* on the inner-circumferential side. With the valve V1, V2 according to the present embodiment, the flow path of the hydraulic oil can be sufficiently secured from an initial stage of opening the valve in which the second valve body 11, 31 moves away from the first valve body 10, 30. It is therefore possible to effectively reduce the pressure loss caused by the second valve body 11, 31, thereby further effectively attenuating the damping force. Furthermore, when the second valve body 11, 31 abuts on the regulating portion 2*g*, 5*j*, the notch 11*a*, 31*a* provided on the inner circumference of the second valve body 11, 31 can function as a communication passage to secure a flow path area. It is therefore possible to improve the degree of freedom in designing a shape and installation position of the regulating portion 2*g*, 5*j*.

The valve V1, V2 according to the present embodiment further includes a first valve body biasing member B1, B2 that biases the first valve body 10, 30 toward the valve seat member. As the valve seat member (piston 2, valve case 5) is seen from a direction orthogonal to the axial direction of the annular window 2*c*, 5*f*, the inner-circumferential valve seat 2*d* is disposed higher than the outer-circumferential valve seat 2*e*. With the valve V1, V2 configured above, the first valve body 10, 30 is warped toward the second valve body 11, 31, and the second valve body 11, 31 is biased toward the first valve body 10, 30 by the second valve body biasing member S1, S2. As a result, the second valve body 11, 31 is brought into close contact with a piston side surface of the first valve body 10, 30, thereby tightly closing the hole 10*a*, 30*a*. It is therefore possible to reliably make the orifice 12*a*, 32*a* function as a unidirectional orifice.

In the valve V1, V2 according to the present embodiment, the first valve body biasing member B1, B2 includes: an annular plate 14, 34 that has elasticity and that is disposed on an opposite valve seat member side of the first valve body 10, 30; and a ring 15, 35 that has an annular plate shape, that is disposed between the first valve body 10, 30 and the annular plate 14, 34, and that has an inner diameter which is larger than any of inner diameters of the first valve body 10, 30 and the annular plate 14, 34 and which is smaller than any of outer diameters of the first valve body 10, 30 and the annular plate 14, 34. With the valve V1, V2 configured above, a structure of the first valve body biasing member B1, B2 can be made simple and a length thereof in an axial direction can be made short. Thus, even if the valve V1, V2 is applied to the shock absorber D, a stroke length of the shock absorber D is not impaired. It is therefore possible to avoid an excessive increase in an entire length of the shock absorber D.

Figure 7:
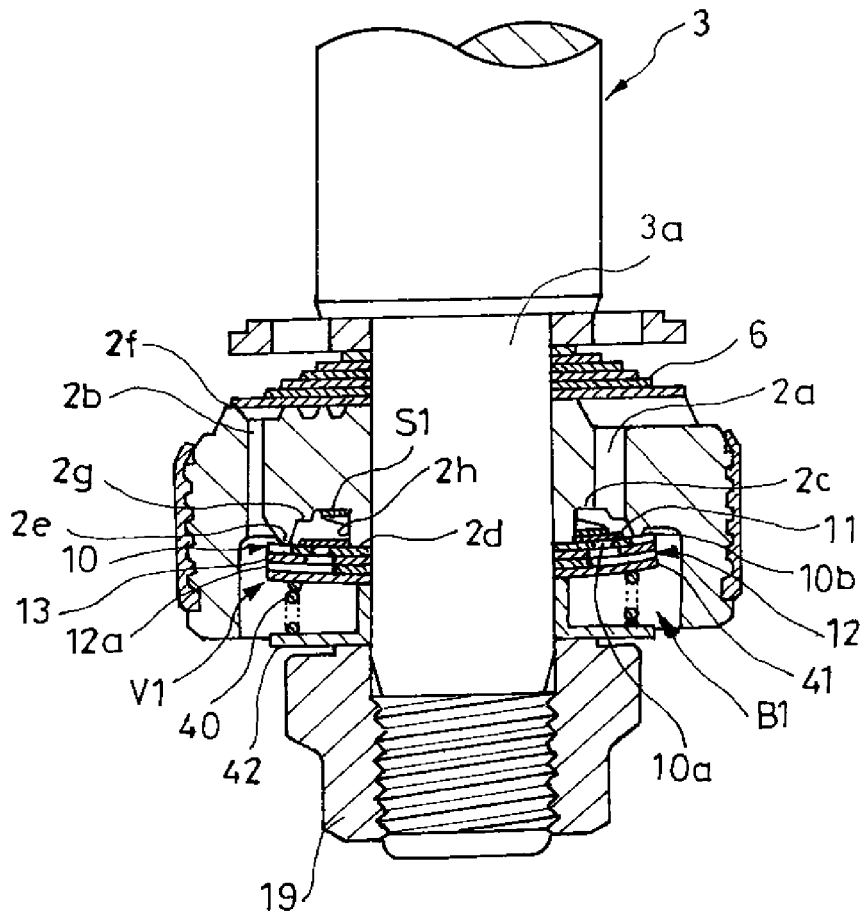
FIG. 7 is an enlarged cross-sectional view of a piston that employs a valve according to a first modification of the embodiment.

As illustrated in FIG. 7, the first valve body biasing member B1 may be formed of an elastic body 40. In the illustrated example, a disc 41 that has the same diameter as that of the orifice valve body 12 may be stacked on the elastic body 40 in order to suppress an arc-shaped hole 12*b* in an orifice valve body 12 from communicating with the compression side chamber R2 without the orifice 12*a*. Then, the elastic body 40 may be disposed in a compressed state between the disc 41 and a stopper 42 by which the elastic body 40 is fixed to an end of the piston rod 3. The elastic body 40 may be rubber or a spring, such as a coil spring or a disc spring. If this configuration is employed, a structure may also be employed, in which the second valve body 11, the first valve body 10, the disc 13, the orifice valve body 12, and the disc 41 are arranged so as to be movable relative to the piston rod 3 in the axial direction and to integrally move away from the piston 2 serving as a valve seat member in response to compression of the elastic body 40. The configuration of the first valve body biasing member B1 in the valve V1 illustrated in FIG. 7 is also applicable to the valve V2 provided in the valve case 5.

The valve V1, V2 according to the present embodiment includes an orifice valve body (throttle valve body) 12, 32 that has an annular plate shape and that is provided with an orifice (throttle) 12*a*, 32*a* which, when the orifice valve body 12, 32 is stacked on an opposite valve seat member side of the first valve body 10, 30, leads to the hole 10*a* or 30*a*. Since the valve V1, V2 configured above is provided with the orifice valve body (throttle valve body) 12, 32, it can make an opening area of the orifice (throttle) 12*a*, 32*a* constant, independently of a relative position of the first valve body 10, 30 and the orifice valve body 12, 32 in the circumferential direction. The hole 10*a*, 30*a* may be used as an orifice (throttle); however, the degree of communication between the hole 10*a*, 30*a* and the notch 13*a*, 33*a* that makes the hole 10*a*, 30*a* communicate with the compression side chamber R2 or the reservoir chamber R varies depending on a relative position of the first valve body 10, 30 and the disc 13, 33 in the circumferential direction. Thus, if the hole 10*a*, 30*a* is used as an orifice (throttle), it is necessary to position the first valve body 10, 30 and the disc 13, 33 in the circumferential direction during assembly. By providing the orifice valve body (throttle valve body) 12, 32, however, an opening area of the orifice (throttle) 12*a*, 32*a* is not varied so that an assembly process can be easy to perform. Therefore, the shock absorber D can exert a damping force with the orifice (throttle) 12*a*, 32*a* having a constant opening area.

In the embodiment described above, the throttle is formed of an orifice; however, the throttle may be formed of a choke instead of an orifice. In this case, a throttle valve body provided with a choke instead of the orifice 12*a*, 32*a* may be provided instead of the orifice valve body 12, 32.

The valve V1, V2 according to the present embodiment is provided with a fixed orifice 10*b*, 30*b*. It is thus possible to independently set damping force characteristics on both expansion and compression sides of the shock absorber D only with the valve V1, V2. In the present embodiment, the fixed orifice 10*b*, 30*b* is installed by a notch provided on an outer circumference of the first valve body 10, 30. However, a recess that makes the annular window 2*c*, 5*f* communicate with the compression side chamber R2 or the reservoir chamber R may be provided in the outer-circumferential valve seat 2*e*, 5*h* and may be used as the fixed orifice.

In the present embodiment, the valve V1 is provided on a compression side chamber R2 side of the piston 2; however, the valve V1 may be provided on an extension side chamber R1 side of the piston 2. Furthermore, the valve V2 is provided on a reservoir chamber R side of the valve case 5;

however, the valve V2 may be provided on the compression side chamber R2 side of the valve case 5. The valve V1, V2 can reliably close the orifice even in an unloaded state, independently of a structure of the shock absorber. Moreover, the advantage of being able to solve a disadvantage in which the damping characteristics may change is not lost.

Figure 8:
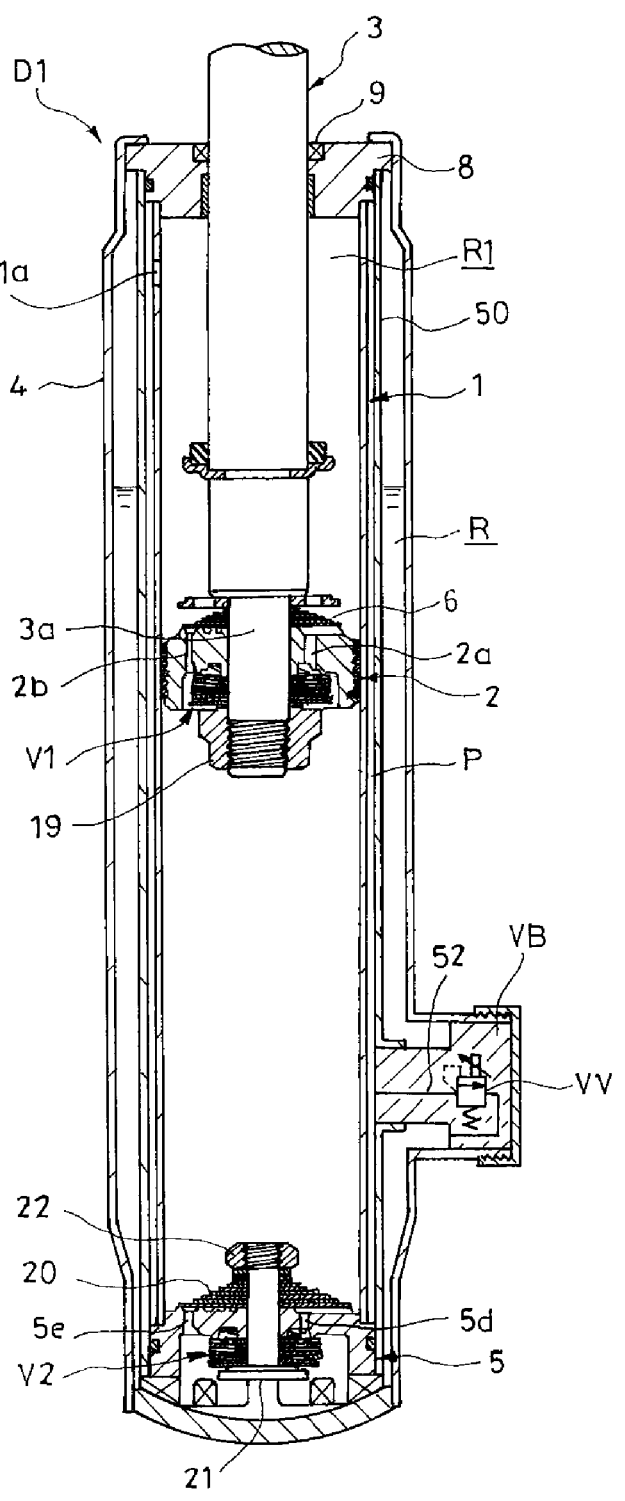
FIG. 8 is a cross-sectional view of a shock absorber according to a second modification of the embodiment.

As illustrated in FIG. 8, the valve V1, V2 is also applicable to a uniflow-type shock absorber D1 that can vary a damping force. In addition to the configuration of the shock absorber D, the shock absorber D1 includes an intermediate tube 50 between a cylinder 1 and an outer tube 4. An annular gap between the cylinder 1 and the intermediate tube 50 communicates with an extension side chamber R1 via a hole 1a provided in the cylinder 1. Furthermore, the shock absorber D1 includes a valve block VB provided with a variable damping valve VV on a lower side of the outer tube 4. The valve block VB makes a reservoir chamber R, which is formed of an annular gap between the intermediate tube 50 and the outer tube 4, communicate with the annular gap via the variable damping valve VV. In the shock absorber D1, a damping passage P is formed of the annular gap between the cylinder 1 and the intermediate tube 50 and the passage 52 provided in the valve block VB which makes the annular gap communicate with the reservoir chamber R.

The variable damping valve VV, which is provided in the passage 52, permits only the flow of the hydraulic oil from the extension side chamber R1 to the reservoir chamber R and gives resistance to the flow of the hydraulic oil passing through the damping passage P.

The variable damping valve VV, which is a solenoid valve provided with a solenoid, is configured to give resistance to the hydraulic oil flowing through the damping passage P from the extension side chamber R1 to the reservoir chamber R and to adjust a valve opening pressure by means of a current applied to the solenoid. The variable damping valve VV configured above functions as a pressure control valve that adjusts a valve opening pressure in accordance with the amount of electricity to the solenoid and can adjust a damping force generated by the shock absorber. In addition to the damping valve that makes the damping force variable by adjusting the valve opening pressure, the variable damping valve VV can also be used as a damping valve having any configuration that can adjust the damping force.

Continuing to the above, actions of the shock absorber D1 configured above will be described. First, a case where the shock absorber D1 extends will be described. When the shock absorber D1 performs an extending stroke by causing the piston 2 to move to the upper side (in FIG. 8) relative to the cylinder 1, the extension side chamber R1 is compressed, and the compression side chamber R2 is expanded. When the piston speed, which corresponds to the moving speed of the piston 2 relative to the cylinder 1, is low, the pressure inside the extension side chamber R1 is higher than that inside the compression side chamber R2, but the difference in pressure between the extension side chamber R1 and the compression side chamber R2 does not reach the valve opening pressure of the first valve body 10. As a result, the first valve body 10 in the valve V1 is kept in a state where it seats on an outer-circumferential valve seat 2e. If the valve opening pressure of the variable damping valve VV is set to a low value, the variable damping valve VV opens so that hydraulic oil moves from the extension side chamber R1 to the reservoir chamber R via the damping passage P. If the valve opening pressure of the variable damping valve VV is set to a high value, the variable damping valve VV is kept closed, so that the hydraulic oil moves from the extension side chamber R1 to the compression side chamber R2 via fixed orifices 10b.

When the piston speed is within a low-speed range during an extending stroke, as illustrated in FIG. 8, the shock absorber D, in response to the regulation of the variable damping valve VV, can adjust the damping force within a range from a damping force (dashed line in FIG. 9) at which the valve opening pressure of the variable damping valve VV is set to a minimum value to a damping force (solid line in FIG. 9) generated only by the fixed orifices 10b.

Since the piston rod 3 exits from the interior of the cylinder 1 in the extending stroke of the shock absorber D1, the amount of hydraulic oil which is equivalent to the volume of the piston rod 3 exiting from the cylinder 1 becomes insufficient inside the cylinder 1. When the piston speed is low, the difference in pressure between the reservoir chamber R and the compression side chamber R2 is small, so that the case side valve 20 provided in the valve case 5 does not open, but a second valve body 31 in the valve V2 moves away from a first valve body 30 to open holes 30a. In this case, the amount of hydraulic oil which is equivalent to the insufficient volume inside the cylinder 1 is supplied from the reservoir chamber R into the cylinder 1 via the fixed orifices 30b and the orifices 32a. In short, when the shock absorber D1 extends at a low piston speed, the fixed orifices 30b as well as the orifices 32a becomes effective.

When the piston speed increases during the extending stroke, the difference in pressure between the extension side chamber R1 and the compression side chamber R2 increases. The pressure inside the extension side chamber R1 can be controlled by adjusting the valve opening pressure of the variable damping valve VV until the difference in pressure between the extension side chamber R1 and the compression side chamber R2 reaches the valve opening pressure of the first valve body 10. When the difference in pressure between the extension side chamber R1 and the compression side chamber R2 reaches the valve opening pressure of the first valve body 10, the force of pushing the first valve body 10 overcomes the biasing force of a first valve body biasing member B1. As a result, the first valve body 10 becomes warped and comes off an outer-circumferential valve seat 2e, opening extension side ports 2a. In response, the hydraulic oil flows through an annular gap appearing between the first valve body 10 and the outer-circumferential valve seat 2e and moves from the extension side chamber R1 to the compression side chamber R2. Since the difference in pressure between the reservoir chamber R and the compression side chamber R2 increases, the case side valve 20 provided in the valve case 5 opens, opening the suction ports 5e. Thus, the amount of hydraulic oil which is equivalent to the insufficient volume inside the cylinder 1 flows through the suction ports 5e and is thereby supplied from the reservoir chamber R into the cylinder 1.

When the piston speed is within a high-speed range during an extending stroke, as illustrated in FIG. 8, the shock absorber D1, in response to the regulation of the variable damping valve VV, can adjust the damping force within a range from the damping force (dashed line in FIG. 9) at which the valve opening pressure of the variable damping valve VV is set to a minimum value to a damping force (solid line in FIG. 9) generated by the first valve body 10. As described above, the first valve body 10 in the valve V1 applied to the shock absorber D1 functions as a relief valve that determines the maximum damping force in the extending stroke.

When the piston speed is within the low-speed range in the extending stroke, the hydraulic oil flowing from the reservoir chamber R toward the compression side chamber R2 passes through both the fixed orifices 30b and the orifices 32a. Consequently, it is possible to secure a large flow path area by opening the second valve body 31. When the piston speed reaches the high-speed range, the case side valve 20 opens, opening the suction ports 5e. However, it is possible to suppress pressure fluctuations inside the compression side chamber R2 because it is possible to decrease the degree of change in the flow path area before and after the opening of the case side valve 20.

Second, a case where the shock absorber D1 shortens will be described. When the shock absorber D1 performs a shortening stroke by causing the piston 2 to move to a lower side (in FIG. 1) of the cylinder 1, the compression side chamber R2 is compressed, and the extension side chamber R1 is expanded. When the piston speed is low, the pressure inside the compression side chamber R2 exceeds that inside the extension side chamber R1. Since the difference in pressure between the compression side chamber R2 and the extension side chamber R1 is small, the piston side valve 6 does not open, but a second valve body 11 in the valve V1 opens, opening the holes 10a. As a result, the hydraulic oil flowing from the compression side chamber R2 to the extension side chamber R1 moves through the fixed orifices 10b and the orifices 12a. In short, when the shock absorber D1 shortens at a low piston speed, the fixed orifices 10b as well as the orifices 12a becomes effective.

Since the piston rod 3 is inserted into the cylinder 1 in the shortening stroke of the shock absorber D1, the amount of hydraulic oil which is equivalent to the volume of the piston rod 3 inserted into the cylinder 1 becomes excessive inside the cylinder 1. When the piston speed is low, the first valve body 30 in the valve V2 does not open because the differential pressure between the compression side chamber R2 and the reservoir chamber R is small. If the valve opening pressure of the variable damping valve VV is set to a low value, the variable damping valve VV opens so that hydraulic oil moves from the extension side chamber R1 to the reservoir chamber R via the damping passage P. If the valve opening pressure of the variable damping valve VV is set to a high value, the variable damping valve VV is kept closed, so that the hydraulic oil moves from the compression side chamber R2 to the reservoir chamber R via fixed orifices 30b.

When the piston speed is within a low-speed range during a shortening stroke, as illustrated in FIG. 8, the shock absorber D1, in response to the regulation of the variable damping valve VV, can adjust the damping force within a range from a damping force (dashed line in FIG. 9) at which the valve opening pressure of the variable damping valve VV is set to a minimum value to a damping force (solid line in FIG. 9) generated only by the fixed orifices 30b.

When the piston speed increases during the shortening stroke, the difference in pressure between the compression side chamber R2 and the reservoir chamber R increases. In this situation, the difference in pressure between the compression side chamber R2 and the extension side chamber R1 increases. In response, the piston side valve 6 provided in the piston 2 opens, opening compression side ports 2b. As a result, the difference in pressure between the compression side chamber R2 and the extension side chamber R1 is maintained at about the valve opening pressure of the piston side valve 6. The pressure inside the cylinder 1 can be controlled by adjusting the valve opening pressure of the variable damping valve VV until the difference in pressure between the compression side chamber R2 and the reservoir chamber R reaches the valve opening pressure of the first valve body 30. When the difference in pressure between the compression side chamber R2 and the reservoir chamber R reaches the valve opening pressure of the first valve body 30, the force of pushing the first valve body 30 overcomes the biasing force of a first valve body biasing member B2. As a result, the first valve body 30 becomes warped and comes off an outer-circumferential valve seat 5h, opening damping ports 5d. In response, the hydraulic oil flows through an annular gap appearing between the first valve body 30 and the outer-circumferential valve seat 5h and moves from the compression side chamber R2 to the reservoir chamber R.

Figure 9:
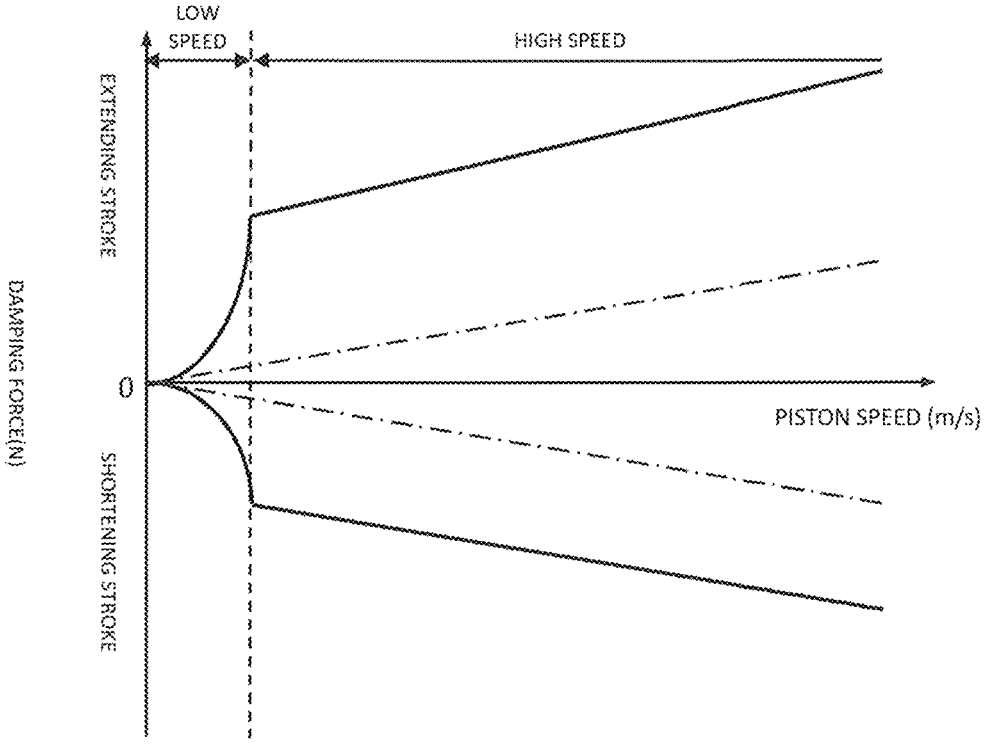
FIG. 9 is a diagram of damping force characteristics of a shock absorber according to the second modification of the embodiment.

When the piston speed is within a high-speed range during the shortening stroke, as illustrated in FIG. 9, the shock absorber D1, in response to the regulation of the variable damping valve VV, can adjust the damping force within a range from the damping force (dashed line in FIG. 9) at which the valve opening pressure of the variable damping valve VV is set to a minimum value to a damping force (solid line in FIG. 9) generated by the first valve body 30. As described above, the first valve body 30 in the valve V2 applied to the shock absorber D1 functions as a relief valve that determines the maximum damping force in the shortening stroke.

When the piston speed is within the low-speed range in the shortening stroke, the hydraulic oil flowing from the compression side chamber R2 toward the extension side chamber R1 can pass through both the fixed orifices 10b and the orifices 12a. Consequently, it is possible to secure a large flow path area by opening the second valve body 11. When the piston speed reaches the high-speed range, the piston side valve 6 opens, opening the compression side ports 2b. However, it is possible to suppress pressure fluctuations inside the extension side chamber R1 because it is possible to decrease the degree of change in the flow path area before and after the opening of the piston side valve 6.

As can be understood from the above description, the shock absorber D1 basically behaves as a uniflow-type shock absorber in which hydraulic oil flows from the interior of the cylinder 1 to the reservoir chamber R through the variable damping valve VV, regardless of whether the shock absorber D1 extends or shortens. Whereas the first valve body 10 functions as a relief valve when the pressure inside the extension side chamber R1 becomes excessive, the first valve body 30 functions as a relief valve when the pressure inside the compression side chamber R2 becomes excessive.

A shock absorber D1, as described above, includes: a cylinder 1; a piston 2 that is movably inserted into the cylinder 1 and divides an interior of the cylinder 1 into an extension side chamber R1 and a compression side chamber R2; a piston rod 3 that is inserted into the cylinder 1 and coupled to the piston 2; an outer tube 4 that is disposed on an outer circumference of the cylinder 1 and has a reservoir chamber R formed therein; a valve case 5 that is provided at an end of the cylinder 1 and divides the compression side chamber R2 from the reservoir chamber R; a piston side valve 6 that is provided on an extension side chamber R1 side of the piston 2 and opens or closes a compression side port 2b provided in the piston 2; a case side valve 20 that is provided on a compression side chamber R2 side of the valve case 5 and opens or closes a suction port 5e provided in the valve case 5; a damping passage P via which the extension side chamber R1 communicates with the reservoir chamber R; a variable damping valve VV that is provided in the damping passage P and that gives resistance to a flow of a liquid flowing from the extension side chamber R1 to the reservoir chamber R; a valve V1 disposed on a compression side chamber R2 side of the piston 2; and a valve V2 disposed on a reservoir chamber R side of the valve case 5.

The shock absorber D1 configured above can suppress pressure inside the compression side chamber R2 from fluctuating before and after opening of the case side valve 20 during an extending stroke. Also, the shock absorber D configured above can suppress pressure inside the extension side chamber R1 from fluctuating before and after opening of the piston side valve 6 during a shortening stroke. Therefore, the shock absorber D1 configured above can reliably close orifices 12a and 32a even in an unloaded state, thereby successfully suppressing generation of abnormal noise and, if applied to a suspension of a vehicle, improving ride quality in the vehicle.

When the piston speed is within a low-speed range during an extending stroke, as described above, a range of a damping force that can be adjusted by the variable damping valve VV is that from a damping force at which the valve opening pressure of the variable damping valve VV is set to a minimum value to a damping force generated only by fixed orifices 10b. In this case, when it is necessary to increase a variable range of the damping force in the extending stroke, the flow path area of the fixed orifices 10b may be reduced to increase the generated damping force. Even if the flow path area of the fixed orifices 10b is reduced to increase the variable range of the damping force in this manner, the second valve body 11 opens the holes 10a to make the orifices 12a effective during the shortening stroke. This suppresses abnormal noise from being generated during the shortening stroke.

When the piston speed is within a low-speed range during the shortening stroke, as described above, the range of the damping force that can be adjusted by the variable damping valve VV is that from a damping force at which the valve opening pressure of the variable damping valve VV is set to a minimum value to a damping force generated only by the fixed orifices 30b. In this case, when it is necessary to increase the variable range of the damping force in the shortening stroke, the flow path area of the fixed orifices 30b may be reduced to increase the generated damping force. Even if the flow path area of the fixed orifices 30b is reduced to increase the variable range of the damping force in this manner, the second valve body 31 opens the holes 30a to make the orifices 32a effective during the extending stroke. This suppresses abnormal noise from being generated during the extending stroke.

As described above, by providing the valve V1 on a compression side chamber R2 side of the piston 2 and providing the valve V2 on a reservoir chamber R side of the valve case 5 in the shock absorber D1, abnormal noise can be suppressed from being generated, with the damping force adjustable range of the shock absorber D1 being reserved.

In the case where the valve V1 is provided on the compression side chamber R2 side of the piston 2 and the valve case 5 is provided with a leaf valve instead of the valve V2, it is possible to widen the damping force variable range in the extending stroke the shock absorber D1 and to suppress pressure fluctuations inside the extension side chamber R1 before and after the opening of the piston side valves 6 in the shortening stroke thereof, thereby preventing generation of abnormal noise. If a problem does not arise in which abnormal noise is generated during the extending stroke of the shock absorber D1, the valve V1 may be provided only on the compression side chamber R2 side of the piston 2 as described above.

Furthermore, in the case where the valve V2 is provided on the reservoir chamber R side of the valve case 5 and a leaf valve or a variable damping valve is provided in the piston 2 instead of the valve V1, it is possible to widen the damping force variable range in the shortening stroke the shock absorber D1 and to suppress pressure fluctuations inside the compression side chamber R2 before and after the opening of the case side valves 20 in the extending stroke thereof, thereby preventing generation of abnormal noise. If a problem does not arise in which abnormal noise is generated during the shortening stroke of the shock absorber D1, the valve V2 may be provided only on the reservoir chamber R side of the valve case 5 as described above.

In the above description, the present invention has been described by taking a double cylinder type shock absorber as an example. However, the valve V1 may be applied to a piston in a monotube type shock absorber, in which case the valve V1 might be provided on one or each of an extension side chamber side and a compression side chamber of the piston.

Although some preferred embodiments of the present invention have been described above in detail, modifications, variations, and changes can be made without departing from the scope of the claims.

The present application claims priority based on Japanese Patent Application No. 2021-045332 filed with the Japan Patent Office on Mar. 19, 2021, and the entire contents of this application are incorporated into the present specification by reference.

The invention claimed is:

1. A valve comprising:
   a valve seat member that has a port, an annular window which communicates with an outlet end of the port, an inner-circumferential valve seat provided on an inner-circumferential side of the annular window, and an outer-circumferential valve seat provided on an outer-circumferential side of the annular window;
   a first valve body that has an annular plate shape, is stacked on the valve seat member with an inner circumference thereof fixed, can seat on or come off the outer-circumferential valve seat to open or close the annular window, and has a hole which faces the annular window and which forms a throttle or a passage leading to a throttle;
   a second valve body that has an annular plate shape, is contained in the annular window so as to be movable in an axial direction, and closes the hole when abutting on a valve seat member side surface of the first valve body;
   a second valve body biasing member that is contained in the annular window and biases the second valve body toward the first valve body;
   a flow path securing regulating portion that restricts the movement of the second valve body in a direction in which the second valve body moves away from the first valve body to prevent the second valve body from closing the outlet end of the port when the second valve body moves a predetermined distance or more away from the first valve body; and
   a communication passage that secures communication between the hole and the port even when the second valve body abuts on the flow path securing regulating portion.

2. The valve according to claim 1, further comprising
   a first valve body biasing member that biases the first valve body toward the valve seat member, wherein
   as the valve seat member is seen from a direction orthogonal to the axial direction of the annular window, the inner-circumferential valve seat is disposed higher than the outer-circumferential valve seat.

3. The valve according to claim 2, wherein the first valve body biasing member includes an annular plate that has elasticity and is disposed on an opposite valve seat member side of the first valve body, an inner-circumferential side of the annular plate being immovably fixed to the valve seat member, and a ring that has an annular plate shape and is disposed between the first valve body and the annular plate, an inner diameter of the ring being larger than any of inner diameters of the first valve body and the annular plate and smaller than any of outer diameters of the first valve body and the annular plate.

4. The valve according to claim 1, further comprising a throttle valve body that has an annular plate shape and is provided with the throttle which leads to the hole when the throttle valve body is stacked on an opposite valve seat member side of the first valve body.

5. The valve according to claim 1, wherein a fixed orifice is provided on an outer circumference of the first valve body or the outer-circumferential valve seat of the valve seat member.

6. The valve according to claim 1, wherein an inner-circumferential side surface of the annular window is formed of a cylindrical surface having a center aligned with an axial center of the annular window, and the second valve body has an inner circumference that is slidably in contact with the cylindrical surface and is guided by the cylindrical surface to move in the axial direction relative to the valve seat member.

7. A valve comprising:

a valve seat member that has a port, an annular window which communicates with an outlet end of the port, an inner-circumferential valve seat provided on an inner-circumferential side of the annular window, and an outer-circumferential valve seat provided on an outer-circumferential side of the annular window;

a first valve body that has an annular plate shape, is stacked on the valve seat member with an inner circumference thereof fixed, can seat on or come off the outer-circumferential valve seat to open or close the annular window, and has a hole which faces the annular window and which forms a throttle or a passage leading to a throttle;

a second valve body that has an annular plate shape, is contained in the annular window so as to be movable in an axial direction, and closes the hole when abutting on a valve seat member side surface of the first valve body;

a second valve body biasing member that is contained in the annular window and biases the second valve body toward the first valve body;

a flow path securing regulating portion that restricts the movement of the second valve body in a direction in which the second valve body moves away from the first valve body to prevent the second valve body from closing the outlet end of the port when the second valve body moves a predetermined distance or more away from the first valve body; and a communication passage that secures communication between the hole and the port even when the second valve body abuts on the flow path securing regulating portion, wherein the second valve body has an inner circumference having one or more notches, and a part or whole of the communication passage is formed by the notches.

8. A shock absorber comprising:

a cylinder;

a piston that is movably inserted into the cylinder and divides an interior of the cylinder into an extension side chamber and a compression side chamber;

a piston rod that is inserted into the cylinder and coupled to the piston;

an outer tube that is disposed on an outer-circumferential side of the cylinder and has a reservoir chamber formed therein;

a valve case that is provided at an end of the cylinder and divides the compression side chamber from the reservoir chamber;

a piston side valve that is provided on an extension side chamber side of the piston and opens or closes a compression side port provided in the piston;

a case side valve that is provided on a compression side chamber side of the valve case and opens or closes a suction port provided in the valve case; and the valve according to claim 1, wherein the valve seat member is formed of the piston, and the valve is disposed on a compression side chamber side of the piston, the valve seat member is formed of the valve case, and the valve is disposed on a reservoir chamber side of the valve case, or the valve seat member is formed of the piston, the valve is disposed on the compression side chamber side of the piston, the valve seat member is formed of the valve case, and the valve is disposed on the reservoir chamber side of the valve case.

9. A shock absorber comprising:

a cylinder;

a piston that is movably inserted into the cylinder and divides an interior of the cylinder into an extension side chamber and a compression side chamber;

a piston rod that is inserted into the cylinder and coupled to the piston;

an outer tube that is disposed on an outer-circumferential side of the cylinder and has a reservoir chamber formed therein;

a valve case that is provided at an end of the cylinder and divides the compression side chamber from the reservoir chamber;

a piston side valve that is provided on an extension side chamber side of the piston and opens or closes a compression side port provided in the piston;

a case side valve that is provided on a compression side chamber side of the valve case and opens or closes a suction port provided in the valve case;

a damping passage via which the extension side chamber communicates with the reservoir chamber;

a variable damping valve that is provided in the damping passage and gives resistance to a flow of a liquid from the extension side chamber to the reservoir chamber; and the valve according to claim 1, wherein the valve seat member is formed of the piston, and the valve is disposed on a compression side chamber side of the piston, the valve seat member is formed of the valve case, and the valve is disposed on a reservoir chamber side of the valve case, or the valve seat member is formed of the piston, the valve is disposed on the compression side chamber side of the piston, the valve seat member is formed of the valve case, and the valve is disposed on the reservoir chamber side of the valve case.

10. The valve according to claim 1, wherein a bottom portion of the annular window in the valve seat member has a stepped shape in which its outer-circumferential side is one step higher than its inner-circumferential side, and the flow path securing regulating portion is formed in a portion on the bottom portion of the annular window which is one step higher on its outer-circumferential side.

11. The valve according to claim 1, wherein the flow path securing regulating portion is formed by a plurality of projections provided in the annular window at some intervals in a circumferential direction.

* * * * *